United States Patent
Reitnour et al.

(10) Patent No.: US 8,606,872 B1
(45) Date of Patent: Dec. 10, 2013

(54) METHOD AND APPARATUS FOR ORGANIZING, PACKAGING, AND SHARING SOCIAL CONTENT AND SOCIAL AFFILIATIONS

(71) Applicant: HotSpots U, Inc., Malvern, PA (US)

(72) Inventors: Philip A. Reitnour, Malvern, PA (US); Nicholas R. Reitnour, Malvern, PA (US)

(73) Assignee: HotSpots U, Inc., Malvern, PA (US)

(*) Notice: Subject to any disclaimer, the term of this patent is extended or adjusted under 35 U.S.C. 154(b) by 0 days.

(21) Appl. No.: 13/657,370

(22) Filed: Oct. 22, 2012

(51) Int. Cl.
  *G06F 15/16* (2006.01)
(52) U.S. Cl.
  USPC ............ 709/206; 709/203; 709/204; 709/217
(58) Field of Classification Search
  USPC .......................................................... 709/206
  See application file for complete search history.

(56) References Cited

U.S. PATENT DOCUMENTS

| | | | |
|---|---|---|---|
| 2002/0042846 A1* | 4/2002 | Bottan et al. ................... | 709/249 |
| 2004/0193441 A1* | 9/2004 | Altieri ............................ | 705/1 |
| 2006/0235967 A1* | 10/2006 | Fritz ............................... | 709/224 |
| 2006/0259574 A1* | 11/2006 | Rosenberg ..................... | 709/217 |
| 2007/0279494 A1* | 12/2007 | Aman et al. ................... | 348/169 |
| 2008/0208962 A1* | 8/2008 | Kim et al. ...................... | 709/203 |
| 2009/0106380 A1* | 4/2009 | Asthana et al. ................ | 709/206 |
| 2010/0088340 A1* | 4/2010 | Muller et al. .................. | 707/783 |
| 2011/0072085 A1* | 3/2011 | Standley ........................ | 709/204 |
| 2011/0167125 A1* | 7/2011 | Achlioptas .................... | 709/206 |
| 2011/0319051 A1 | 12/2011 | Reitnour | |
| 2012/0123811 A1* | 5/2012 | Socolof ........................... | 705/5 |
| 2012/0143952 A1* | 6/2012 | von Graf ........................ | 709/204 |
| 2013/0132836 A1* | 5/2013 | Ortiz .............................. | 715/716 |

* cited by examiner

*Primary Examiner* — Richard G Keehn
(74) *Attorney, Agent, or Firm* — Woodcock Washburn LLP

(57) ABSTRACT

A method and associated system are provided for managing an invitation for a current event, comprising: capturing real-time information during the event on a mobile device; selecting one or more invitees on the device; and transmitting an invitation to attend the event to the invitee comprising necessary details for attending the event along with the captured real-time information.

16 Claims, 24 Drawing Sheets

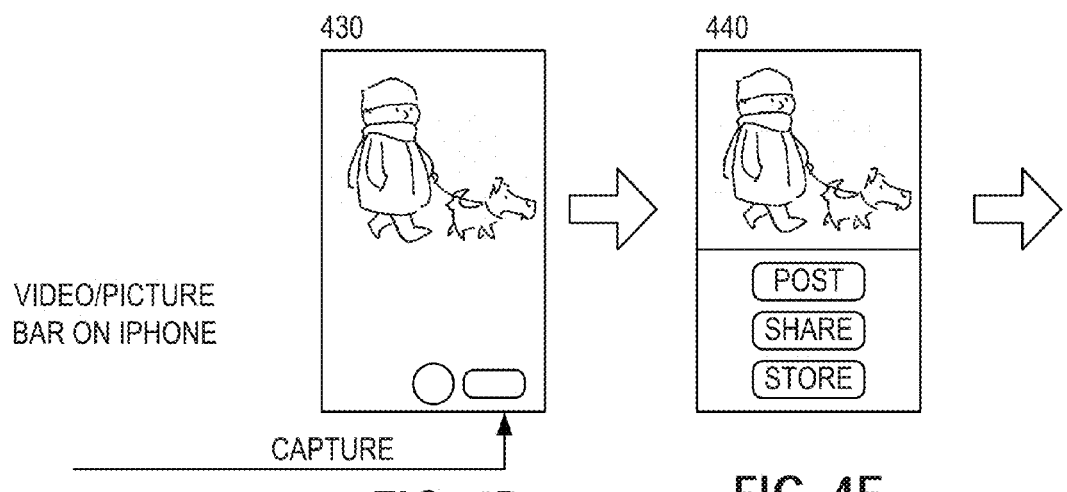
FIG. 4D
FIG. 4E
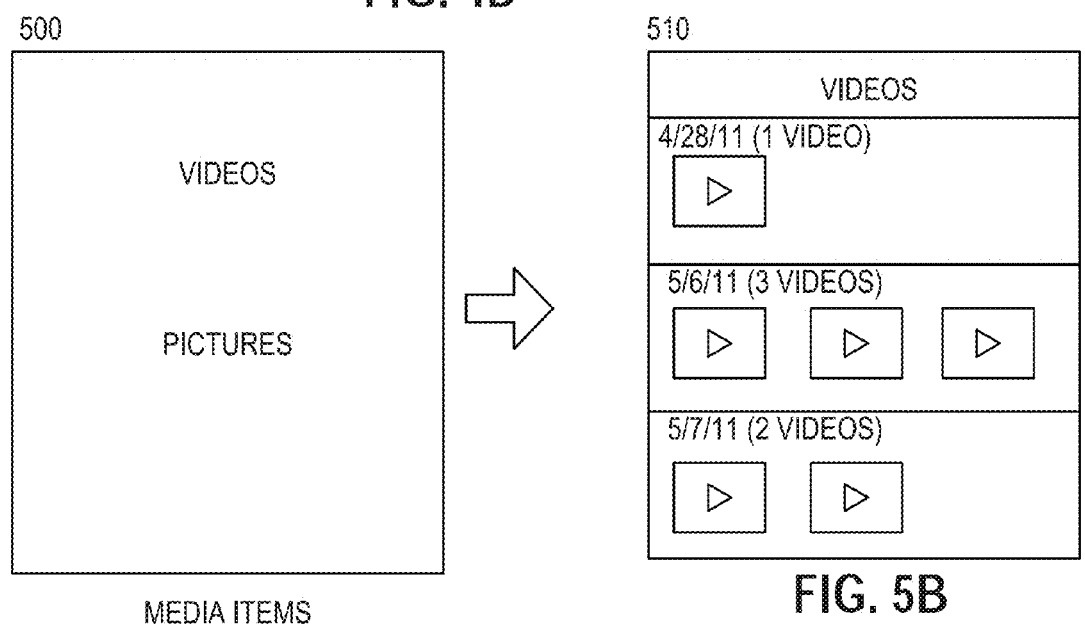
FIG. 5A
FIG. 5B

600

| TRANSPORTATION |
| --- |
| CAB |
| SERVICE : NUMBER<br>SERVICE : NUMBER |
| BUS |
| SERVICE : NUMBER |
| TRAIN |
| SERVICE : NUMBER |

PROFILE

NAME
CURRENTLY:

( INFO ) ( VIDEOS ) ( PICTURES ) ( FRIENDS ) ( EVENTS ) ( WALL )

| BEFORE (NAME) ⊞ | |
|---|---|
| 801 MAP<br>WHERE | 802 CAR<br>TRANSPORTATION |
| 803 PERSON<br>WHO | |
| 804 ITEMS<br>WHAT | 805 CLOCK<br>WHEN |

⇐ CREATE NEW EVENT; IF INVITED & CHECK ATTENDANCE, THN THE NAME AUTOMATICALLY APPEARS (ALONG WITH LOCATION & REQUIREMENTS/ NECESSITIES

| WHERE 801  802 |
| TRANSPORTATION |
| WHO 803 |
| WHEN 804 |
| WHAT 805 |

BEFORE

| TRANSPORTATION |
|---|
| CAB |
| SERVICE : NUMBER |
| SERVICE : NUMBER |
| BUS |
| SERVICE : NUMBER |
| TRAIN |
| SERVICE : NUMBER |

TRANSPORTATION

| YESTERDAY |
|---|
| EVENT (TIME) |
| EVENT (TIME) |
| TODAY |
| EVENT (TIME) |
| EVENT (TIME) |
| TOMORROW |
| EVENT (TIME) |
| EVENT (TIME) |

WHEN

PARTY NAME:
PEOPLE ATTENDED:
HOST / LOCATION:

1502

| PICTURES (4) | VIDEOS (5) |

☐ ☐ ☐ ☐

RATING _____
★ ★ ★ ★ ★ ★ ★ ★ ★ ★
MESSAGE:

EVENT NAME

INVITED BY:
PEOPLE:
TIME:
LOCATION:
ADDRESS:
MESSAGE:

MEDIA ITEM ATTACHED TO INVITATION

ATTENDING  YES   NO   MAYBE
PICTURES  VIDEOS  LIVE

BELOW THIS ON WEBSITE, TO VIEW MORE INFORMATION ABOUT YOUR FRIENDS AND EVENTS LO IN TO HOTSPOTS

EXISTING MEMBERS

USERNAME:
PASSWORD:

NEW MEMBER

EMAIL:
PASSWORD:

FIG. 16

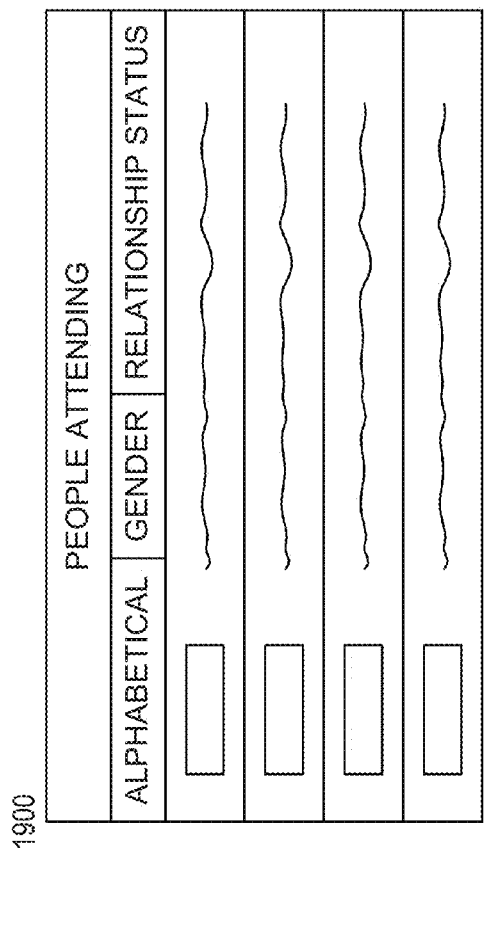
FIG. 19
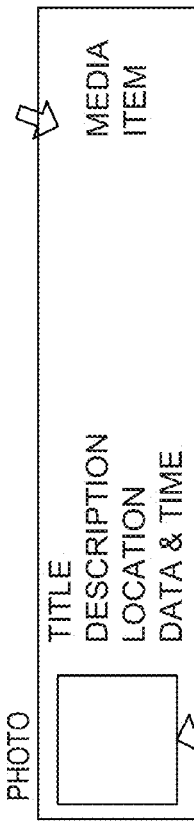
FIG. 20

2700
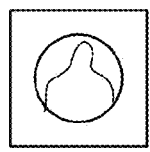  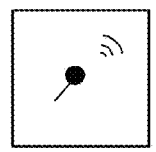 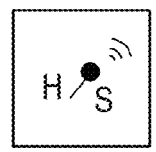
OLD FAN DIRECT APP 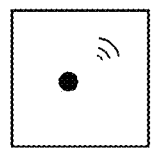 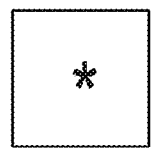
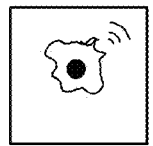 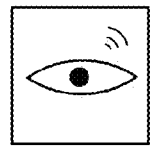 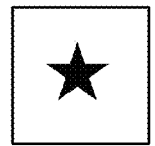
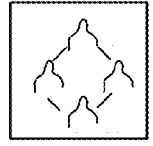 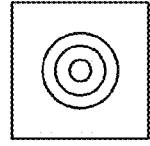 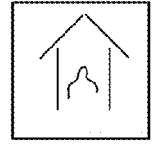
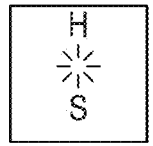 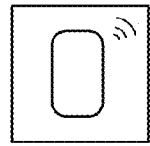 
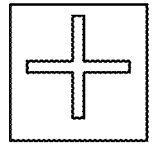 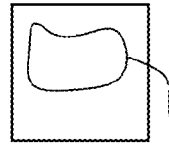 MAP
FIG. 27

METHOD AND APPARATUS FOR ORGANIZING, PACKAGING, AND SHARING SOCIAL CONTENT AND SOCIAL AFFILIATIONS

FIELD

The present application is directed to a social network application for managing events. The application is designed to operate as both a "closed" network, i.e., only open to friends or other users that a particular user has accepted into the network, and an "open" network, i.e., where any user can access media or information that has not restrictions placed on it by the content creator.

BACKGROUND

In the discussion of the background that follows, reference is made to certain structures and/or methods. However, the following references should not be construed as an admission that these structures and/or methods constitute prior art.

Managing events often require an enormous amount of work and planning on the part of an event organizer. Additionally the event organizer may not be able to solicit the help of friends in an adequate way to get help. Often with events, it is difficult for an event participant to know enough about the event to determine whether or not they will attend, and it may be difficult for participants to help one another with transportation and needed items for the event. Moreover, it is often very difficult to provide people the opportunity to participate at a public event while the event is ongoing. Additionally, often an event has different time periods to manage the event that may have different needs of management.

SUMMARY

Therefore there is a need in the art for a system, computer readable medium, and a method for a social media system that enables the management of events before the event, during the event, and after the event in the form of a social network that provides the ability to manage events that enables participants to communicate with one another and for the organizer to communicate with multiple participants at the same time. Moreover, there is a need in the art for a system that enables the event to be managed prior to the event, during the event, and after the event.

The various embodiments of the system can provide the advantage that participates can communicate with one another to share transportation, share information regarding needed items at the events, and learn of and post events. The system provides the advantage that the organizer of an event may communicate with participants and since participants can communicate with one another the organizer does not have to be the hub of information for an event.

Embodiments can also provide the advantage of keeping the user on the application from the start of an event to the end of an event providing greater opportunity for advertising and for communication with other users. It allows all the social information and media pertinent to a user on the system to be accessed in one place. Additionally, participating in an event that is managed by the system, (alternately referred to herein as "HotSpotsU") tends to encourage others to use HotSpotsU to manage events. The system may be available via the Internet, and accessible on many different types of devices such as mobile devices and desktop devices. The system has the advantage of creating a network of users that are friends that may share invitations to events and encourage the network of friends to have events.

The system may be used to provide competition to supplement social interactions, but also to spur content. Competition within HotSpotsU, such as who has the average higher rated, or most attended events, not only mimics the nature of real-life social interaction, but it also encourages the user to get more involved in the system to gain the recognition that they feel that they deserve.

Competitions can take place on two levels. One, it could be an open competition that is not limited to confirmed affiliations, which would be a part of the "open" network. Two, competitions could take place within "closed" networks where there is a confirmed affiliation amongst the users, such as school networks. While the most prevalent competitions are short-term ones, e.g., the week's funniest video, the most rewarding and recognized content will be that of the long-term, e.g., "Year's Best Party."

Determining the winner of a competition can be a social experience in itself because of the collaboration required to ultimately decide a winner. A winner can be chosen based on how many votes are received for each nomination. In the case of competitions comparing events, which already have ratings from the attendees, there is no voting required, but rather an accumulation of input/ratings. The competitions are unique in that there are various things that can be compared and various ways in which a winner can be chosen. The winner of the competition receives a kind of status, or points, that distinguishes themself as well as continues to spur the competitive nature that is rampant in social interactions. Users within that network could nominate the items/individuals for the positions. However, in order to create a competition in the first place, a specific user has to create the competition. The creation of the competition could involve specifying the purpose of the competition, the time period during which it will last, the kind of competition that it will be, e.g., "closed" or "open," and the reward.

The system may provide recommendations to user of the system. In this embodiment, the system generates recommendations by technically analyzing the events the user attended and the user's Interests section of their Profile, which includes, but is not limited to, favorite sports teams, bands, hobbies, etc. Using that information, HotSpotsU can then infer similar content. Not only does the recommendation section suggest possible content on the system that would be of interest to the user, it also can alert the user when there is content that perfectly matches their self-described interests (from the Interests section). For example, if the user says they are interested in band xyz, and that band is in that user's town on a certain date, that user is notified.

Events may also be recommended based on their proximity or transportation means. HotSpotsU enables user to search for users with characteristics to invite to events. For example, unemployed users may be invited to a job fair event. HotSpotsU may enable users to request an event. For example, a user may request a concert from a certain band in a desired city.

In addition to the system-to-user recommendations there can also be person-to-person recommendations. For example, if user A enjoyed restaurant xyz then they can recommend that restaurant to a friend. However, these various kinds of recommendations are not sole entities. The combination of these recommendations interact and add up to one system that can ultimately provide the most accurate and relevant recommendations.

Advantageously, the system permits a very simple way to invite friends to an ongoing event, simply by transmitting live video, audio, and/or location information so that friends can see for themselves the desirability of the event. It allows communication through real-time information and is accessible on mobile devices so that one can always have access to events. Important events and aspects can be posted immediately. All relevant information is concisely presented on a series of display screens that are easily accessible. This can thus bypass the traditional describing and direction giving when it comes to an event, such as a party, and makes inviting to preplanned events simple as well.

Smartphones currently enable the individual transmission of the content involved in the event invitation of the system. In an embodiment, the invitation sends all relevant information in one transmission. To further simplify operation, the user can transmit all relevant information from one screen. The single screen can allow users to: 1) stream/stop streaming video; 2) text message; 3) view event info of current location; and 4) invite more people. Just as this system simplifies the way a user invites a person to an event, it also simplifies the way a user is able to look through ongoing events, e.g., through a page label "The Scene."

With regard to the "Scene", the system does not require one to at each person's profile to see what he or she is doing—rather, the viewer can see all of the events that his/her friends are attending, and can see everything that is going on in a particular area all from a single screen.

Furthermore, the system can emphasize the recommendation—since the most trusted kind of recommendation is from one that an individual knows or a trusted friend. This system revolves around social interactions and connections.

From a business standpoint, businesses such as sports teams, venues, artists, etc., can have their own "network" where people can follow them. They can post as much information as they want on their own wall about events, updates, etc. However, in an embodiment, if they want to send a notification out to all of their followers, they could be required to pay a small fee, which prevents the HotSpotsU network from becoming a commercial based (artificial) network.

When a user is searching for a public event, a featured event of the night can be highlighted. The cost of the featured ad can be based on the market size of that area or the user traffic to the page in which the featured ad is located. The larger the market size the more likely a larger number of people will view it, which means the more likely the advertiser will receive interest. In addition, if there are two different event organizers that want to feature their event during a certain time frame, then it may be possible to have them bid for the position.

The system can take advantage of a partnership with a ticket company to sell tickets to the event directly on HotSpotsU. HotSpotsU could receive a percentage of the ticket sale since the system informed the user, or ticket buyer, of the event and then which in turn led them to buy a ticket for the event. In addition, partnerships with services could create discounts for HotSpotsU users, and could be a source of revenue for HotSpotsU since, once again, the system led to purchasing of a good.

Through this service, event planners could create invitations, arrange transportation, and get real-time feedback from the attendees. Eventually the creators of the event could sell tickets directly through HotSpotsU in order to foster exclusivity. Through the social connections of the system, ticket sales could be limited to certain individuals based on certain predefined criteria.

The people recommendations take into account your mutual friends, shared interests, age range, etc., and connects you with people with mutual friends. The event recommendations are generated by a system that understands the kind of events a person likes and finds similar ones (i.e., same people, location, etc.), for example, by way of heuristical analysis or a factor-based comparison. However, the recommendations are only as accurate as the user wants. Events and interests can be rated by the users, and based on the ratings a user gives, the system can recommend new things that are similar to the things the user likes. There may be two types of recommendations: people and events. The people recommendations find people the user might know based on his/her friendships or people with similar interests. The event recommendations can take the ratings that the user gave events in the past and find events similar to the ones you rated high. It also can the user's favorite bands, sports teams, etc., and give the user an alert when they come into town, as discussed above.

The system allows text communication through text messaging within HotSpotsU. It is simplified as much as possible so the user can get the maximum amount of features with the least amount of confusion. In addition, by including text messaging within the system, HotSpotsU can provide a single place for all the social features and functions that a user could need in a simple and organized way.

An event page can be provided where a viewer can see everything about the event: the people attending, videos/pictures, event updates, and crowd breakdown. The crowd breakdown can show, e.g., the percentage of females to males, the percentage of single to dating people (or at least paired), and the average age. This information can be deduced, to the extent possible, through image processing, or it can be provided based on the number of HotSpotsU-registered people in attendance. The event page on HotSpotsU accommodates information for before, during, and after the event.

A user can use the event page to plan for the event before, post updates during, and post pictures/videos and give ratings after. Advantageously, the event page permits users to post pictures directly to the event page while the event is still happening. While an invitation is directed at a certain individual, or individuals, the pictures posted on the event page serve as "live look-ins." These look-ins allow anyone invited to the party to see how it is going even if they are not there.

A user could form a hangout for small events like wanting to hang out with friends. It allows the user to use the invitation feature and confirm that a group of people is together, but it eliminates all the extra controls associated with creating an event. However, if the user wants to convert the hangout into a party, they have the option to do so.

At the bottom of every page there can be a "like" button. By clicking on the like button, HotSpotsU can deliver more accurate recommendations. Users can post content in challenges and competitions in order to win and get status. More importantly, such competitions can be entertaining, as discussed above.

An individual has many different friend circles. HotSpotsU can provide structure for easy organization of friends in a sensible way. The friend circles can focus the user's attention on certain people. For example, if the user's lacrosse team just won a big game and the user wants to go to a party with all lacrosse teammates, the user's friend circles allow focusing all attention to what is happening with those individuals. These friend circles are not just a way to organize the user's friends, but can be a way of simplifying a complicated and rampant social life. In addition, a user can place a single person in multiple friend circles because there might be overlap with friend circles and affiliations.

By organizing the user's friends into personalized groups, the user can have greater control over his/her privacy. The user can select what the people in that group can see. For example, the user can let the people in the group see: 1) the user's friends, 2) the user's personal information, 3) the user's pictures/videos, and 4) the events the user attended. In essence, it can be implemented like a security clearance. The user can dictate that all the people in a particular group can only see x, y, z about the user. It is a way to emulate reality. In the real world only a user's closest friends know all of the user's intimate details. HotSpotsU is a network that mimics reality on many levels.

HotSpotsU also can allow a user to connect on a larger level without having to be friends with everyone. The person can belong to a network: a certified organization that has a large number of people. Examples of networks could include: schools, companies, organizations, etc. In an embodiment, a user can only be a member of a single network, but they can follow other networks. This form of affiliation advantageously creates an additional way to create social connections. While the person-to-person affiliation is a way to confirm acquaintanceship with people, HotSpotsU following allows users to confirm membership or interest with groups.

HotSpotsU can direct competitive nature into formal challenges and competitions. It does provide a way of winning status, but more important it is entertainment. When users are not looking for events, socializing with friends, or following groups, they need something to do or something to keep them engaged. The "open" challenges and competitions are ones in which anyone can submit content, as well as anyone can view. These open challenges are specified "forums," but as HotSpotsU continues to evolve these "forums" can expand into a full-blown public section. The public section would still contain "forums," but the array of forums would be much greater. Users always needs a bit of guidance, or direction to post their content, and forums offer the direction needed while still allowing room for creativity.

A camera button can be provided at the bottom of every page to permit a user to capture any moment. The camera can provide three options: 1) take a picture, 2) take a video, or 3) create an invitation. The idea of videos/pictures is an important advantageous aspect for communication on HotSpotsU. Instead of putting a camera button each individual page, it may be integrated it into the template of HotSpotsU so on every page there is a way to utilize the camera, or capture the moment.

HotSpotsU can provide a "like" button at the bottom of each page. If a user wants to "like" a post, he or she can click the "like" button and click on the liked post, which they are fond of, or like. The post will indicated that the person like it. Clicking the like button on an event page can provide the user with the option to provide a rating of the party (1-10). If the user clicks the like button on a network or in the public section it can becomes a favorite. This button is what fuels the recommendation section.

Since people always need rides from one place to another, HotSpotsU could allow users to send their location to someone else asking for transportation. Users could also send their location to transportation companies like cabs who could then pick them up. It is a convenient way to plan transportation to and from social gatherings.

It could also allow the ability to follow people (i.e., celebrities), and could permit an entirely new way for celebrities to connect with fans. They would actually be able to see pictures and videos of what their favorite celebrities are doing, rather than just hearing a description. If an individual were a celebrity, he or she would have a special profile. Like a normal user they would have a private section where they can socialize with privacy. The difference between their profiles and a normal person's profile is that for the network, the celebrity is their own network. This allows their fans to follow them.

The HotSpotsU social network is based on person-to-person connections. However, the challenge/competition section is more like a "public" section where people can share information with people they do not personally know with a broader topic in mind. This is very similar to how news organizations function. HotSpotsU has the ability to evolve into a site that has all the news—both personal and formal. The key is that the social aspect helps customize formal news to suit interests, in order to block out unwanted news and highlight news that would be of interest.

The system could be used to broadcast on television in that it could broadcast programs that are cool and popular to a broad audience. The difference between this and a typical broadcast is that the programs broadcasted would be events. During the night look-ins could be done on public events all around country. During the day a countdown on the best parties of the previous night could be done, and trending topics could be considered. This idea of a TV channel has the ability to evolve into a modified news station.

On HotSpotsU, the main form of communication is through visuals (pictures and videos). The ability to "see" what is happening is a major component in the collaboration and communication on HotSpotsU. The user can also include a caption, e.g., sixty characters or less, to describe the visual. All visuals may be location and time stamped. The communication through visuals bypasses all the hazy, over-exaggerated event descriptions. It also allows other users to see what is happening without having to be there in person.

Based on the above, a method and associated system are provided for managing an invitation for a current event, comprising: capturing real-time information during the event on a mobile device; selecting one or more invitees on the device; and transmitting an invitation to attend the event to the invitee comprising necessary details for attending the event along with the captured real-time information.

A method and associated system are also provided for managing social interactions of a user, comprising: defining a first group of individuals from a larger set of individuals whose information is stored in a directory of a user device; performing the following exclusively with those in the first group for a limited amount of time: a) communication information associated with an event; b) communicating information associated with a topical recommendation; and c) communicating information associated with a competition.

Finally, a method and associated system are also provided for managing competitions, comprising: establishing a topic that forms a base for a competition, and establishing entries associated with the topic that can be voted on; defining a competition as either an open competition or a closed competition; for an open competition: accumulating votes on the entries from any individual; and publishing voting results related to the entries; and for a closed competition: defining a first group of individuals from a larger set of individuals whose information is stored in a directory of a user device; sending an invitation to vote on an entry of the competition to members of the first group; and publishing voting results related to the entries exclusively to the individuals in the first group.

BRIEF DESCRIPTION OF THE DRAWING

The following detailed description can be read in connection with the accompanying drawings in which like numerals designate like elements and in which:

FIGS. 4A-4E illustrate screens for inviting friends to an event according to an embodiment of the invention;

FIGS. 5A and 5B illustrate screens for managing media according to an embodiment of the invention;

FIG. 6 illustrates a screen for displaying transportation options to an event;

FIG. 7 illustrates screens for managing a profile of a user according to an embodiment of the invention;

FIGS. 8A and 8B illustrate screens for managing the event before the event occurs according to an embodiment of the invention;

FIG. 9 illustrates a screen for managing transportation to and from an event according to an embodiment of the invention;

FIG. 10 illustrates a screen for managing the event when event is occurring according to an embodiment of the invention;

FIG. 15 illustrates a screen for rating an event according to an embodiment of the invention;

FIG. 16 illustrates an Invitation screen to an event according to an embodiment of the invention;

FIG. 19 illustrates a People Attending screen according to an embodiment of the invention;

FIG. 20 illustrates posting of information related to an event to a social media website according to an embodiment of the invention;

FIG. 27 illustrates possible icon designs;

DETAILED DESCRIPTION

Figure 1:
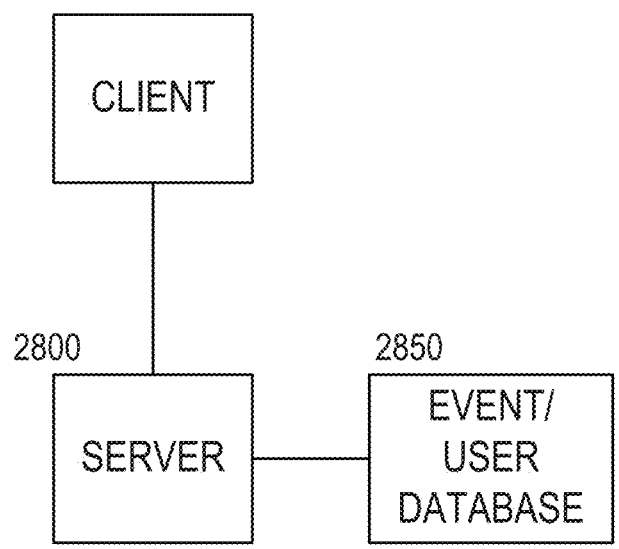
FIG. 1 is a basic block diagram of an exemplary system architecture.

FIG. 1 is a simplistic block diagram illustrating the interaction of a client device 10, which could be a mobile device, such as a smartphone or tablet device, or a user's desktop computer, connected via a network to a server 2800 that interacts with an event database 2850.

Figure 2A:
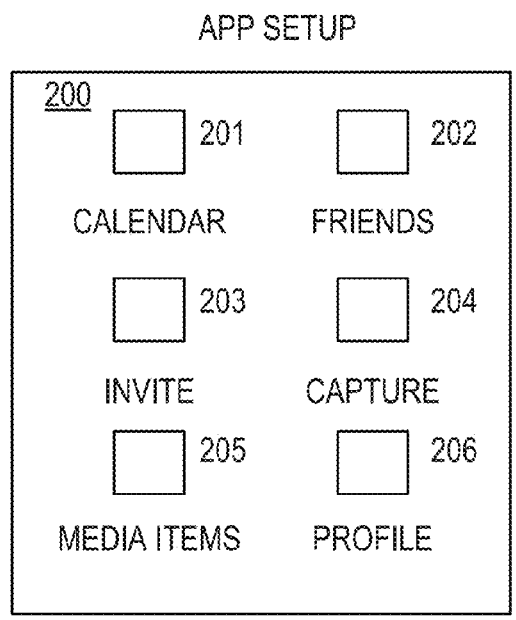
FIGS. 2A and 2B illustrate application Homepage screens according to an embodiment of the invention.
Figure 2B:
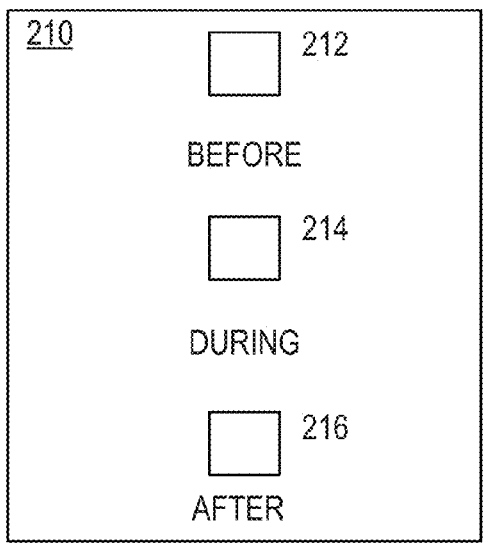

FIGS. 2A and 2B illustrate an application Homepage screen 200, 210 according to an embodiment of the invention. The Homepage screen 200, 210 may include two pages, an App Setup screen 200 and a Timing screen 210. The App Setup screen 200 has buttons/selectable icons that enable the user to access a Calendar feature 201, a Friends feature 202, an Invite feature 203, a Capture feature 204, a Media Items feature 205, and/or a Profile feature 206. The Timing screen 210 enables the user to access a Before feature 212, a During feature 214, and an After feature 216. The Before, During, and After features are relative to event timing so that Before refers to information before events have occurred, During refers to information during an event, and After refers to information after events have occurred. The Homepage scree 200, 210 may include additional features such as ratings, messages, map, share, location, etc.

Figure 2C:
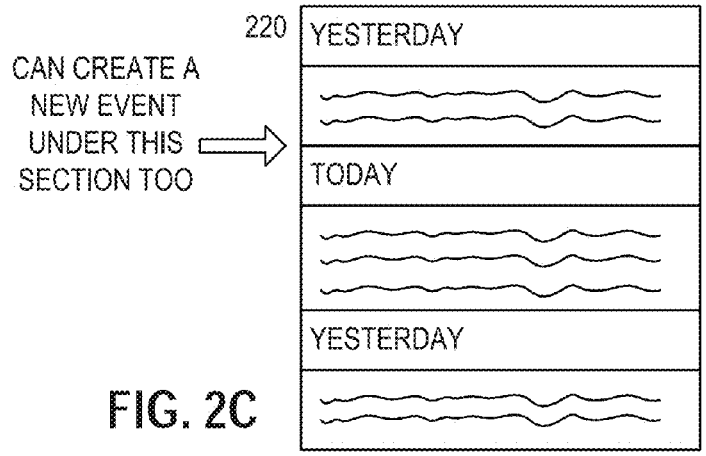
FIG. 2C illustrates a Calendar screen according to an embodiment of the invention.

FIG. 2C illustrates a Calendar screen 220 according to an embodiment of the invention. The Calendar screen 220 may be displayed in response to a selection of the Calendar icon 201. The Calendar screen 220 enables the user to create a new event, including the date of the event.

Figure 3:
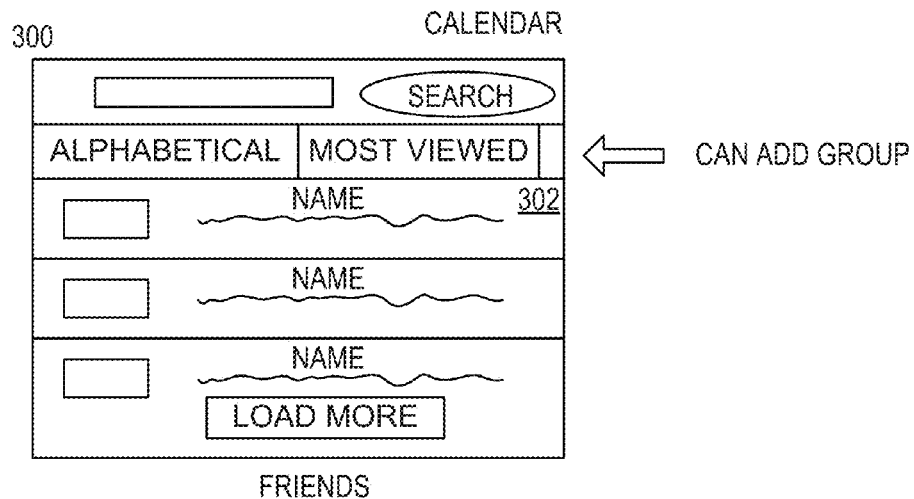
FIG. 3 illustrates a Friends screen according to an embodiment of the invention.

FIG. 3 illustrates a Friends 300 screen according to an embodiment of the invention. The Friends screen 300 may be displayed in response to a selection of a Friends icon 202. The Friends screen 300 enables a user to select friends to invite to an event. The user can select the friends based on an alphabetical listing, a "most viewed" friends, or through a search for a friend. Upon selection of the friends, the selected friends are invited to an event, preferably via an SMS message or e-mail sent to them.

Figures 4A, 4B, 4C:
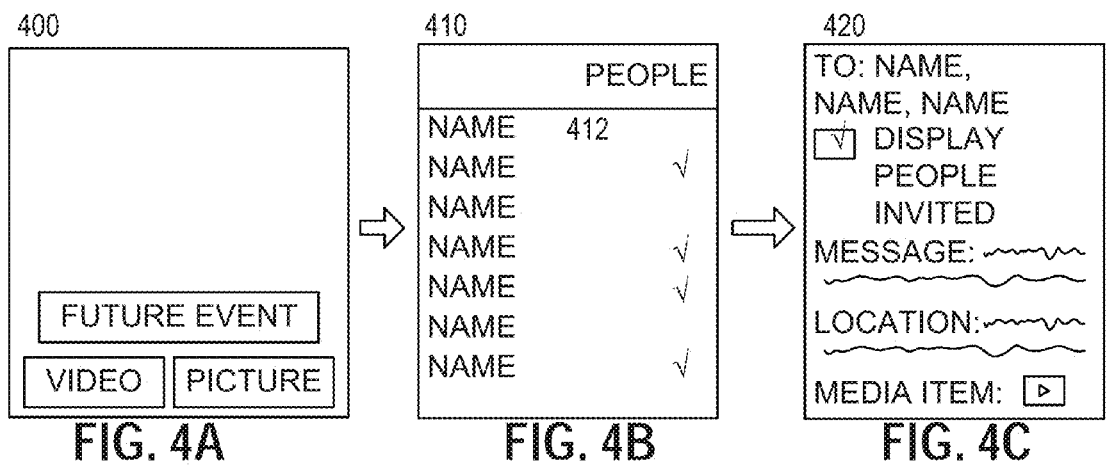

FIGS. 4A-4C illustrate screens 400, 410, 420 for inviting friends to an event according to an embodiment of the invention. The system permits an initial user (event host) to create a particular event, such as a party, get-together, etc. The event host invites other individuals to join the event. If they accept the invitation, they become event members (along with the event host). Non-members can only be invited into an event by the event host or other event member. As such, the event is a closed or exclusive event. FIG. 4A may be displayed in response to the selection of the Invite icon 203.

As illustrated in FIG. 4A, a user can add video, pictures, and friends (FIG. 4B) to an event. The user can create an invitation as illustrated in FIG. 4C that can be sent to the friends that are invited to the event. The user can enter a general description of the location such as "Lincoln Financial" in addition to or instead of a preset "HotSpot" message. In certain embodiments, the exact location of the event can be entered or retrieved. For example, the user may select "here" and the device may determine the address via GPS data. Alternatively, the user may enter partial information and the device may retrieve additional location information.

FIG. 4D illustrates an example screen 430 for capturing a video. FIG. 4D may be displayed in response to the selection of the Capture icon 204. FIG. 4E illustrates how, after the video is displayed, the user may be presented with several options of what to do with the video. The options may include posting the video to be associated with the event, sharing the video with one or more friends, or storing the video. An event member can post live or recorded video, audio, and/or images to other members. By activating the video, audio, or camera, a member can simultaneously send video and location data to other members. U.S. patent application Ser. No. 13/004,705 describes one system which permits a user to transmit video, audio and/or still pictures to predetermined recipients. Such as system could be used in the present invention to allow a member to transmit such data to other members. U.S. patent application Ser. No. 13/004,705 is incorporated herein by reference in its entirety. The system permits a member to provide experiences (data) before, during, and/or after an event. In certain embodiments, a script may be run for inviting friends to the event. For example, the script may present the screens shown in FIGS. 4A-4E and prompt the user to enter the information.

FIGS. 5A and 5B illustrate Media Items screens 500, 510 for managing media according to an embodiment of the invention. The Media Items screens 500, 510 may be reached in response to a selection of a Media icon 205. The Media Items screens 500, 510 enables a user to manage items such as pictures 500 and videos 510. The user may be able to manage the media items by performing the following on the media items: editing, sending, deleting, etc.

FIG. 6 illustrates a Transportation screen 600 for displaying transportation options to an event.

FIG. 7 illustrates a Profile screen 700 for managing a profile of a user according to an embodiment of the invention. The Profile screen 700 may be reached in response to a selection of the Profile icon 206. The Profile screen 700 may include icons for information, videos, pictures, friends, events, etc. The Profile screen 700 may enable a user to post what the user is currently doing which may be sent to a group of friend selected to receive the posts. Events may be private in which case other users that are viewing the profile of the user may not be able to see the private event or may only be able to see the name of the private event.

Users that are viewing the Profile screen 700 of another user and are invited to the same event may be able to select the event and see additional information regarding the event. A public event may be able to be viewed by all users. The Profile screen 700 may include an area where people can post messages to the screen and where the user can post messages on the Profile screen 700. The messages may include various types of media. The Profile screen 700 may include posts from other social media websites such as Twitter and Facebook, messages from other users, personal information, synchronization with other social media websites such as Facebook and Twitter, party ratings, groups of friends, a "currently" field that indicates information about the user in real time such as the user's location or activity, a "looking to" field which may indicate the what the user is seeking such as dinner, drinks, hook-up, etc.

FIGS. 8A and 8B illustrate Before screens 800, 810 for managing an event before the event has occurred according to an embodiment of the invention. FIGS. 8A and 8B may be reached in response to a selection of the Before icon 212. FIGS. 8A and 8B are alternative embodiments for the Before screen 800, 810. This aspect of the application permits a member to upload information about an event that are precursors to the event, such as where the event is, transportation that members are taking, who is attending (members and non-members), when the event will take place, and what to bring. Each of these could be provided in the application as a separate tab, button, hyperlink, etc. that pulls up a subfolder or category which provides information related to the particular topic.

The Before screens 800, 810 may provide a user with management of an event before the event. The management items 810 may include Where, Transportation, Who, When, and What. In the embodiment illustrated in FIG. 8A additional information may be displayed with the management item. For example, displayed with Where is an icon 801 for a map to indicate to the user that selection of Where 801 will display a map. The additional information may include information that indicates current selections for an event. For example, the management item Transportation may be an icon for a car 802, which may simple be the text "car", that indicates that the user intends to use a car for transportation.

As shown in FIGS. 8A and 8B, the system may provide a user with management of an event the user is invited to and provide the user with the ability to accept the invitation and provide an icon 803 to manage items related to the user attending the event. For example, the user may select the icon for What 804 which may display items the user must bring to event and/or items the user should bring to the event. The selection of the What icon 804 may display a list of items that are needed at the event from which the user may select an item to bring to the event. The items to bring to an event may include, for example, money, drinks, ticket, etc. If a user accepts an invitation to an event the name of the event may appear on the screens 800, 810.

FIG. 9 illustrates a Transportation screen 900 for managing transportation to and from an event according to an embodiment of the invention. The Transportation screen 900 may be reached in response to a selection of the Transportation icon 802. The Transportation screen 900 may include the phone numbers of local transportation services such as cabs, buses, and trains, and could possibly even estimate the cost to get to the event based on GPS data related to the user's location and the event location and stored mileage charges or transportation fees.

FIG. 10 illustrates a Timing screen 1000 for managing when events are occurring according to an embodiment of the invention. FIG. 10 may be reached in response to a selection of the When icon 805. The Timing screen 1000 may show times when events start and stop.

Figure 11:
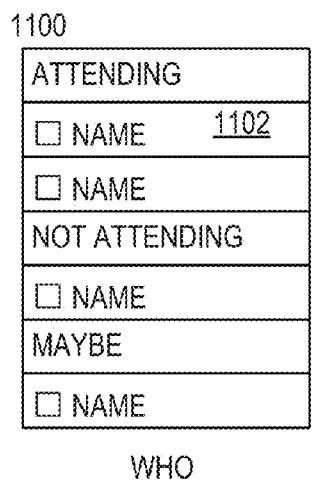
FIG. 11 illustrates a screen for managing who is attending an event according to an embodiment of the invention.

FIG. 11 illustrates a Person screen 1100 for managing who is attending events according to an embodiment of the invention. FIG. 11 may be reached in response to a selection of the Who icon 803. The Person screen 1100 may illustrate the names of the people invited, those that have accepted, and the host of the event.

Figure 12A:
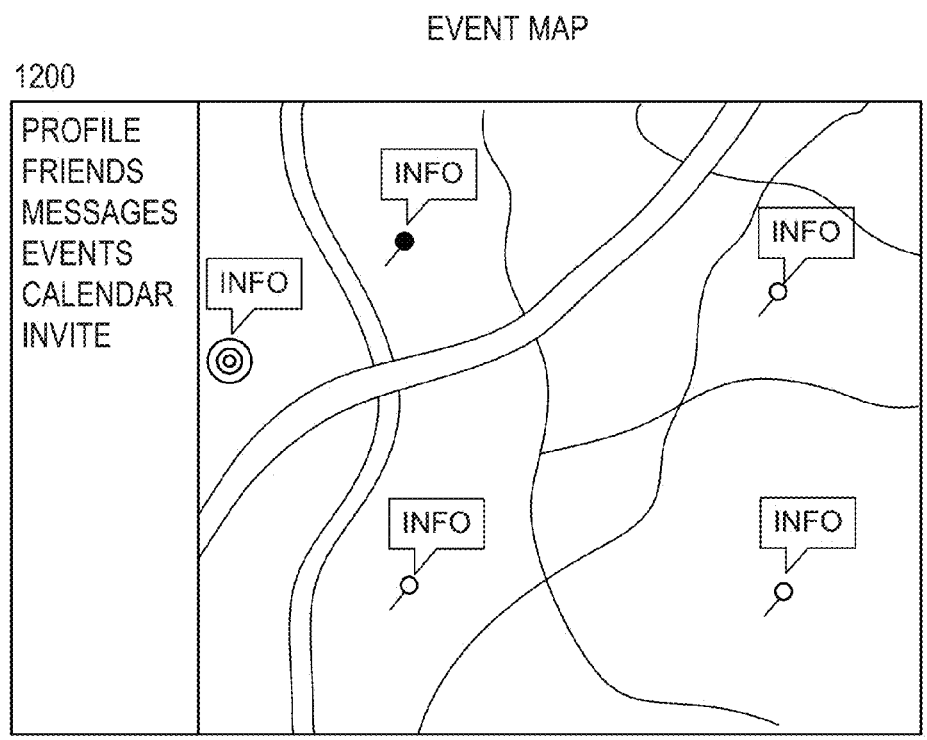
FIGS. 12A-12C illustrate screens for managing where an event is occurring according to an embodiment of the invention.
Figure 12B:
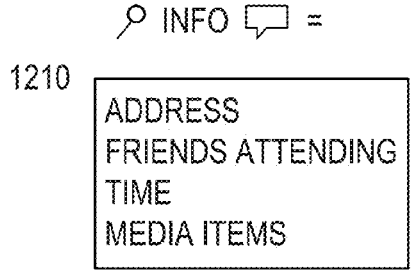
Figure 12C:

FIGS. 12A-12C illustrate Location screens 1200, 1210, 1220 for managing where an event is occurring according to an embodiment of the invention. FIG. 12A may be reached in response to a selection of the Where icon 801. The Location screen 1200 may include an address and/or a map of the location and directions to get there. The users with access to the event could be dynamically listed on the map if their smart phone is active and permits geolocation of the device. The map may include the status of the user such as whether they are en route to the event, at the event, or hanging out in another location, or preparing for the event. The map may include information such as the location of the one or more users who initiated the event and/or the current status of the one or more users who initiated the event.

Figure 13:
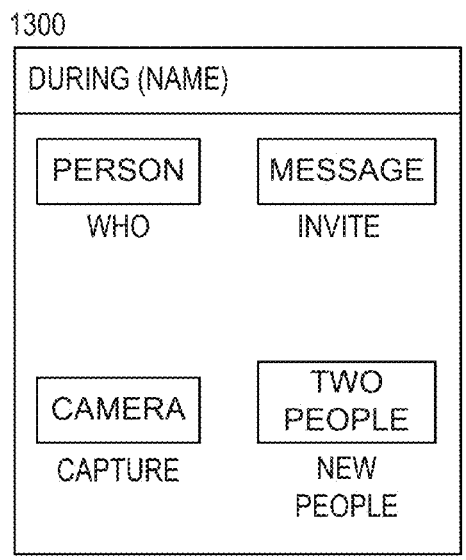
FIG. 13 illustrates a screen for use during an event to manage the event according to an embodiment of the invention.

FIG. 13 illustrates a During screen 1300 for use during an event according to an embodiment of the invention. The During screen 1300 may be reached in response to a selection of the During icon 214. The During screen 1300 may include icons for Who is There, Invite, Capture, and New People, as well as other icons for other features that may be present. Selection of the Who is There icon may show the list of people that confirmed they are at the event. The list of people may include links to pages associated with the people such as Facebook, Twitter, or HotSpot profile pages.

Selection of the Invite icon may allow the user to invite people that are not at the event. The selection of the Invite icon may bring the user to their Facebook or other social media page to invite the person to become a friend. Selection of the Capture icon gives the user options to take pictures and videos of the party. The user may post the media files to the user's Profile Page as an "update" related to the event. Selection of the New People icon allows users to exchange contact information if they meet new people at the event and to optionally become friends within the HotSpots system. The user may exchange contact information based on a location, based on infrared contact, or based on the users exchanging texts with one another. Alternatively, the information may be manually entered.

Figure 14:
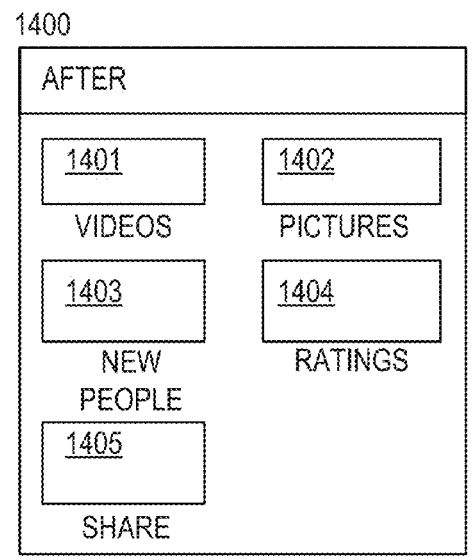
FIG. 14 illustrates a screen for use after an event to manage the event according to an embodiment of the invention.

FIG. 14 illustrates an After screen 1400 for use after an event according to an embodiment of the invention. FIG. 14 may be reached in response to a selection of the After icon 216. The screen 1400 for after an event is a way for users to look back at information related to the party such as media items and "updates". Selection of the Videos icon 1401 may present a list of the videos filmed during the event. Selection of the Pictures icon 1402 may present pictures taken during the event. Selection of New People/People Met icon 1403 may present new people that the user met and/or that were met or new to the event. Selection of the Ratings icon 1404 may present a Ratings screen 1500 (FIG. 15) for the user to rate the event and/or ratings of the events. For example, the user may be presented with a screen 1500 to select a rating from 1 to 10 and enter comments. The Rating screen 1500 may include a link to other events such as top rated events. Selection of the Share icon 1405 may provide a screen 1600 where the user can share the event with other. For example, the user may be able to post it to their FaceBook page or their Profile Page of HotSpot. The user may be able share only some of the items related to the event such as videos the user took. The After screen 1400 may include a party summary. Optionally the user may be able to share information in each of the screens the user is brought to. The user may share by emailing or posting to a social media website.

FIG. 15 illustrates a Rating screen 1500 for rating an event according to an embodiment of the invention. The Rating screen 1500 may be reached in response to a selection of the Rating icon 1404. The Ratings screen 1500 may be partially automatically filled in. For example, fields "party name", "people attended", "host/location", "pictures", and "videos" may be automatically filled in from the event that was being viewed in the After screen 1400. As illustrated, the user has selected a rating of 10 stars for the event. The user may enter a comment as part of the rating. Other user's ratings may be visible to the user. The user may be provided with a field to send a private message to the one or more users that organized the event.

FIG. 16 illustrates an invitation 1600 to an event according to an embodiment of the invention. The invitation 1600 may be received over email, via a social media website, or by other means. The invitation 1600 may include links to HotSpot for the user to logon to their account or to create an account. The invitation 1600 may include a script that prompts the user for whether or not they plan to attend. The invitation 1600 may include media and other invitees, needs for the event, etc. so that the user can determine whether or not they want to attend. The invitation 1600 may include a link for getting directions to the event and/or estimating how long it would take to get to the event. The invitation 1600 may include a link for the user to determine whether other invitees may be passing near the user on their way to the event or whether or not there are other invitees that may provide transportation to the user, or that may need transportation from the user.

Figure 17:
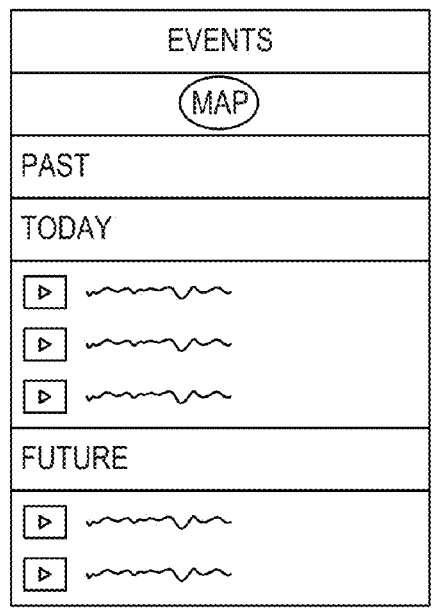
FIG. 17 illustrates an Events screen for managing events according to an embodiment of the invention.

FIG. 17 illustrates an Events screen 1700 to an event according to an embodiment of the invention. The Events screen 1700 may be reached in response to a selection of an icon screens 200, 210. The Events screen 1700 may include a Date icon that may be selected to change dates used to determine which events to display. The Events screen 1700 may include a Map icon that may be selected to display the events on a map. The Events screen 1700 may include a listing of events organized by Past, Today, and Future. The user may select the Past icon to view past events. In embodiments, the Events screen 1700 may be scrolled through to view additional events. The user may enter search criteria such as the number of his friends that have accepted the invitation, ratings of the events, etc. to search for events. The user may be able to select an icon to send a message to all the participants of an event to create a group call or texting session prior to, during, or after the event.

Figure 18:
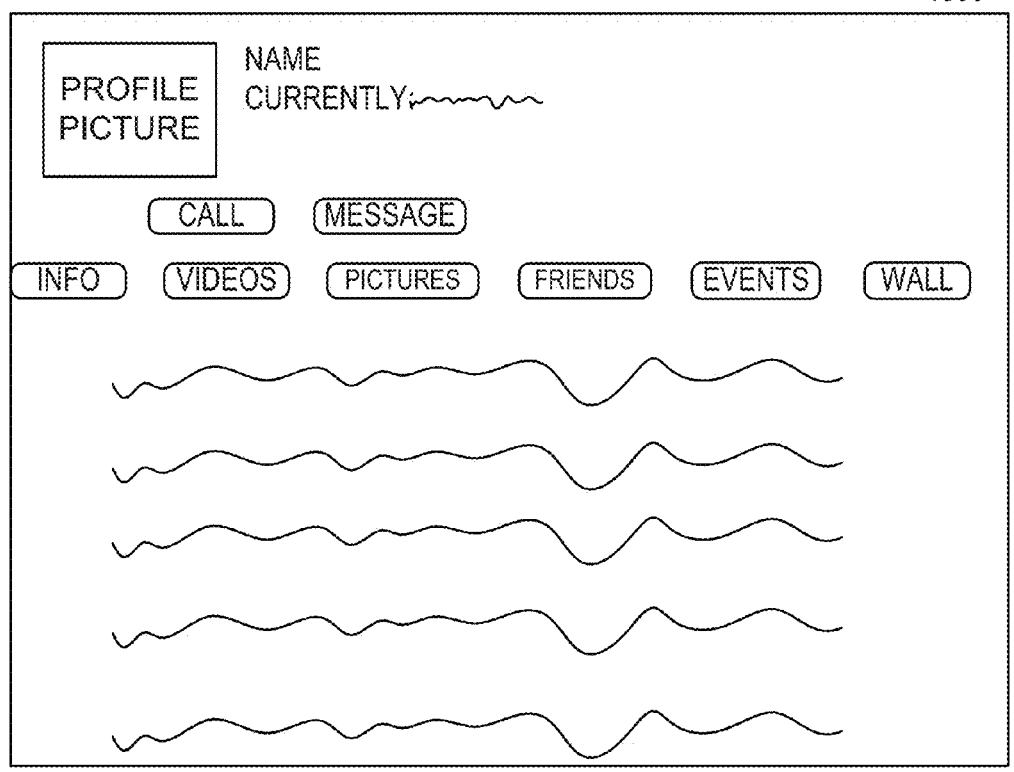
FIG. 18 illustrates a Friend Profile screen according to an embodiment of the invention.

FIG. 18 illustrates a Friend Profile screen 1800 according to an embodiment of the invention. The Friend Profile screen 1800 may be reached in response to a selection of an icon 412, 1102. The selection of the Call icon may use the device's phone application to make a call to the person. When the user makes a call to a friend the device returns to the Friend Profile screen 1800 after the call. Selection of a Message button may allow for communication with the friend via a pop-up, which may be real time chat, or other communication options available, such as the device's messaging software. If the friend is not available, the user is provided the option of sending a text message or the other type of message.

FIG. 19 illustrates a People Attending screen 1900 according to an embodiment of the invention. The People Attending screen 1900 may be reached in response to a selection of an icon 412, 1102. The People Attending screen 1900 enables the user to view the people attending the event. The relationship status allow the user to see the relationship status such as whether or not they are single for people at the event. It has the advantage that people need not be embarrassed to ask whether or not a person is single or looking for a relationship. The "want to" field may indicate the intension of the person at the events. For example, the "want to" field may be drink, dance, find a friend, etc. The people may be able to enter a category or may be able to make their own category or comment regarding what they "want to" do at the event.

FIG. 20 illustrates a Posting screen 2000 to a social media website according to an embodiment of the invention. The Posting screen 2000 may be reached in response to a selection of an icon 1405, 1502. The Posting screen 2000 may include a logo for HotSpot, title, description, location, media items such as pictures and video, and the date and time of the event. If the HotSpot application is running on FaceBook or other social media site, the posting would post the message to that particular site using the user's profile.

In certain embodiments, events can be exclusive (private) or public events. For example, if a user is heading to a certain nightclub, they can use the system to post the event to the general public as an open invitation. The user may include invites to their friends and/or may place the event as a public event that may be viewed in several ways by other users including in a list or map format. Additionally, the user may post the public event to social media websites. The user may be able to post a general notice for a non-private or public event (for example, @a club or sports event, etc.).

Figure 21:
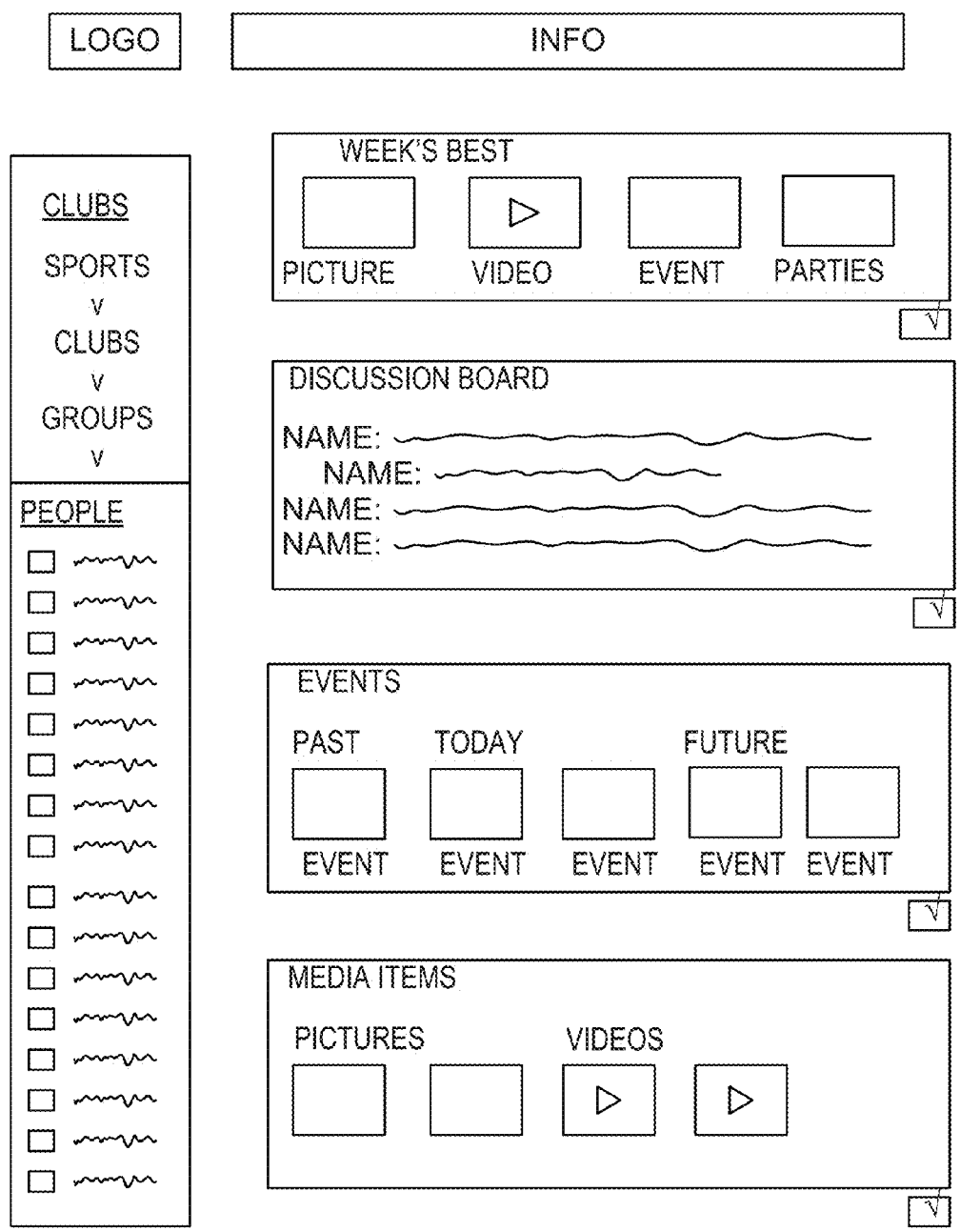
FIGS. 21, 22, and 23 illustrate an embodiment of a Network page according to an embodiment of the invention.
Figure 22:
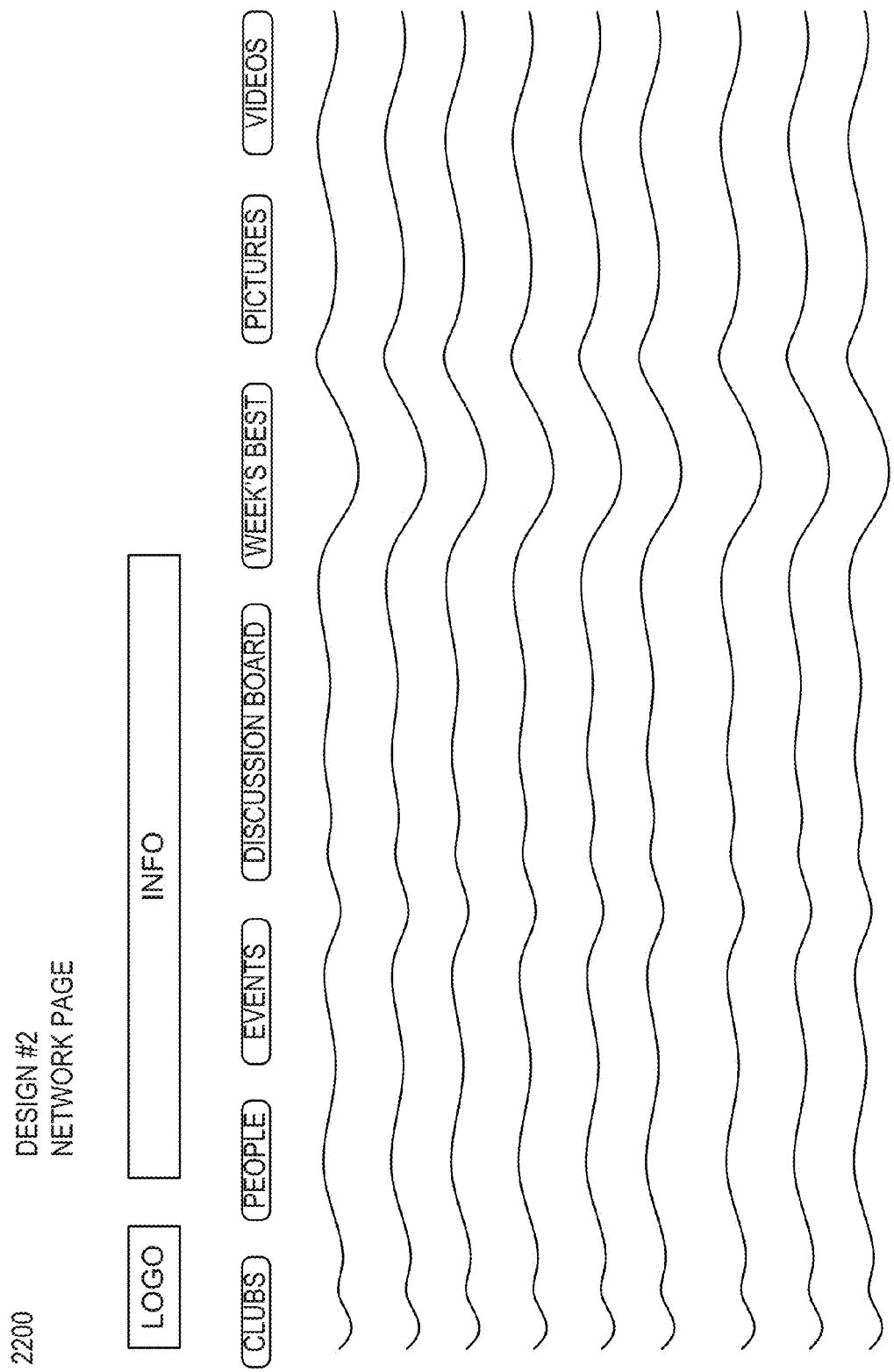
Figure 23:
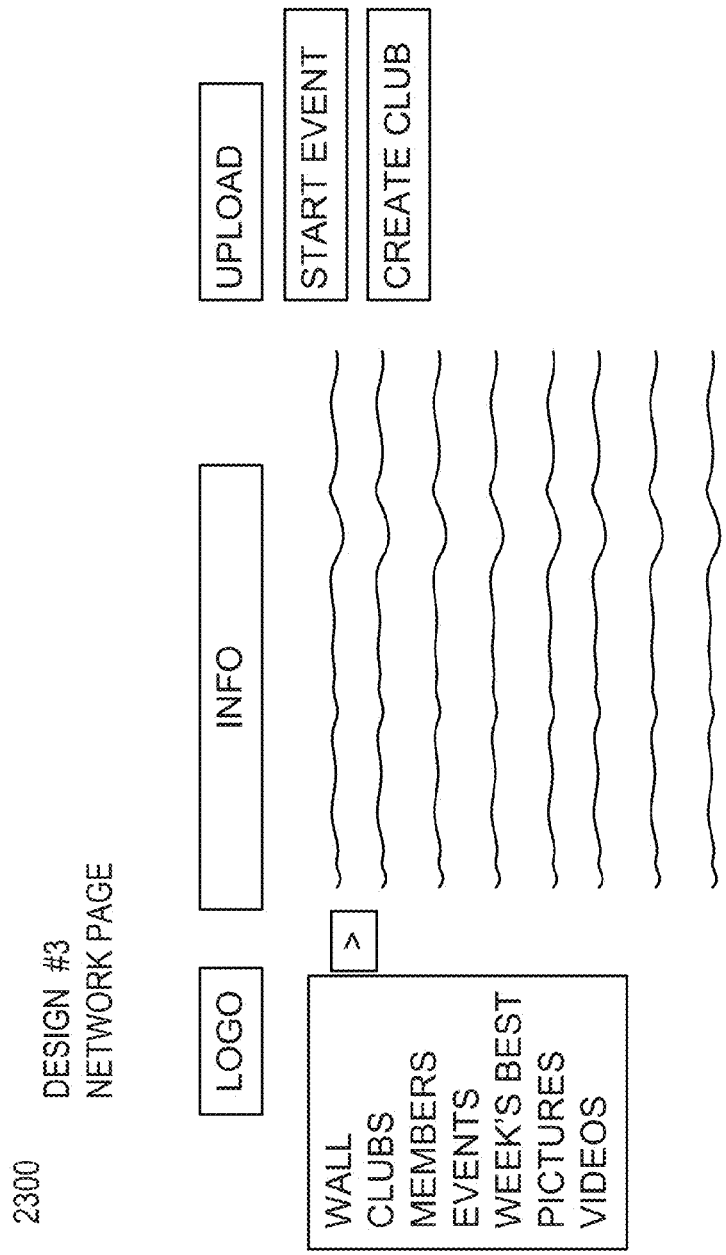

FIGS. 21, 22, and 23 illustrate an embodiment of a Network Page 2100, 2200, 2300 according to an embodiment of the invention. The Network Page may be the home page for the HotSpot network that many users may access.

Figure 24:
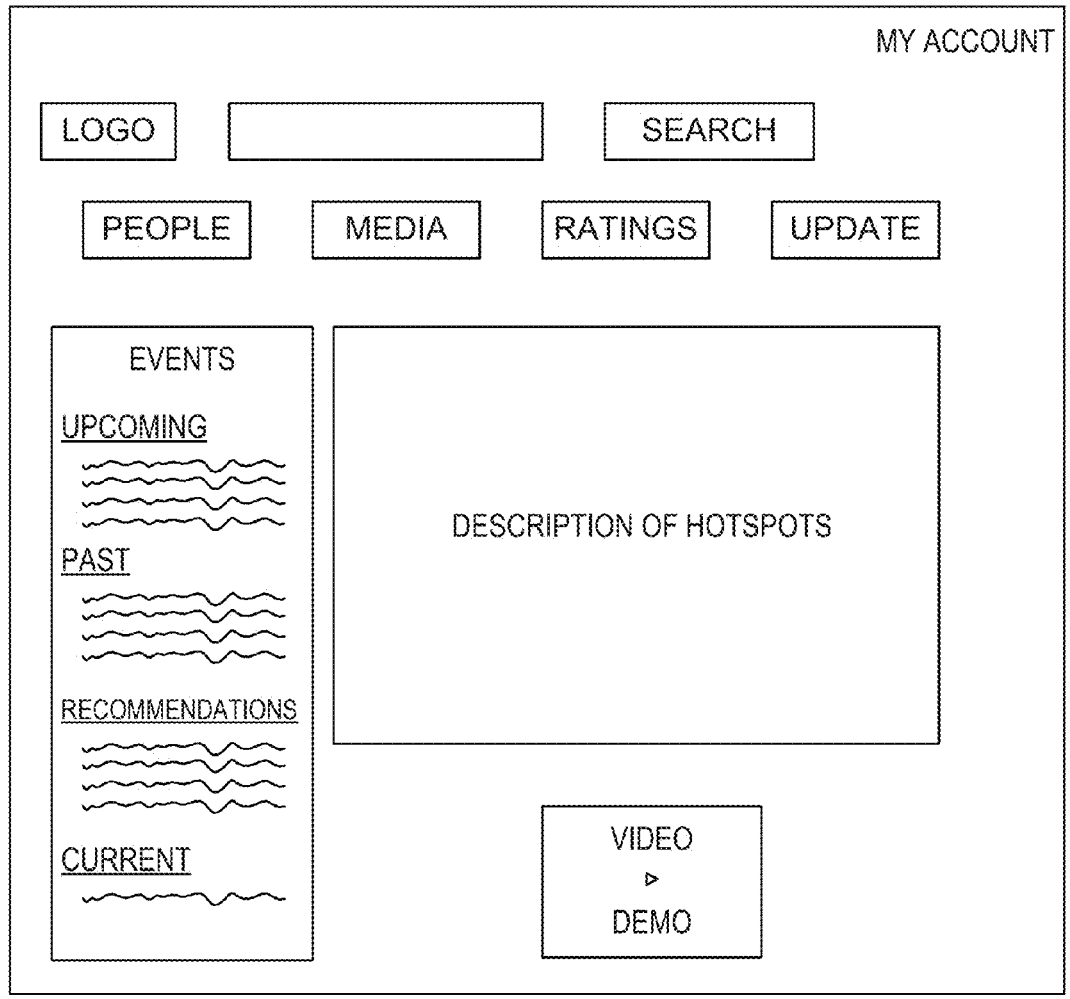
FIG. 24 illustrates an embodiment of a Website page according to an embodiment of the invention.
Figure 25:
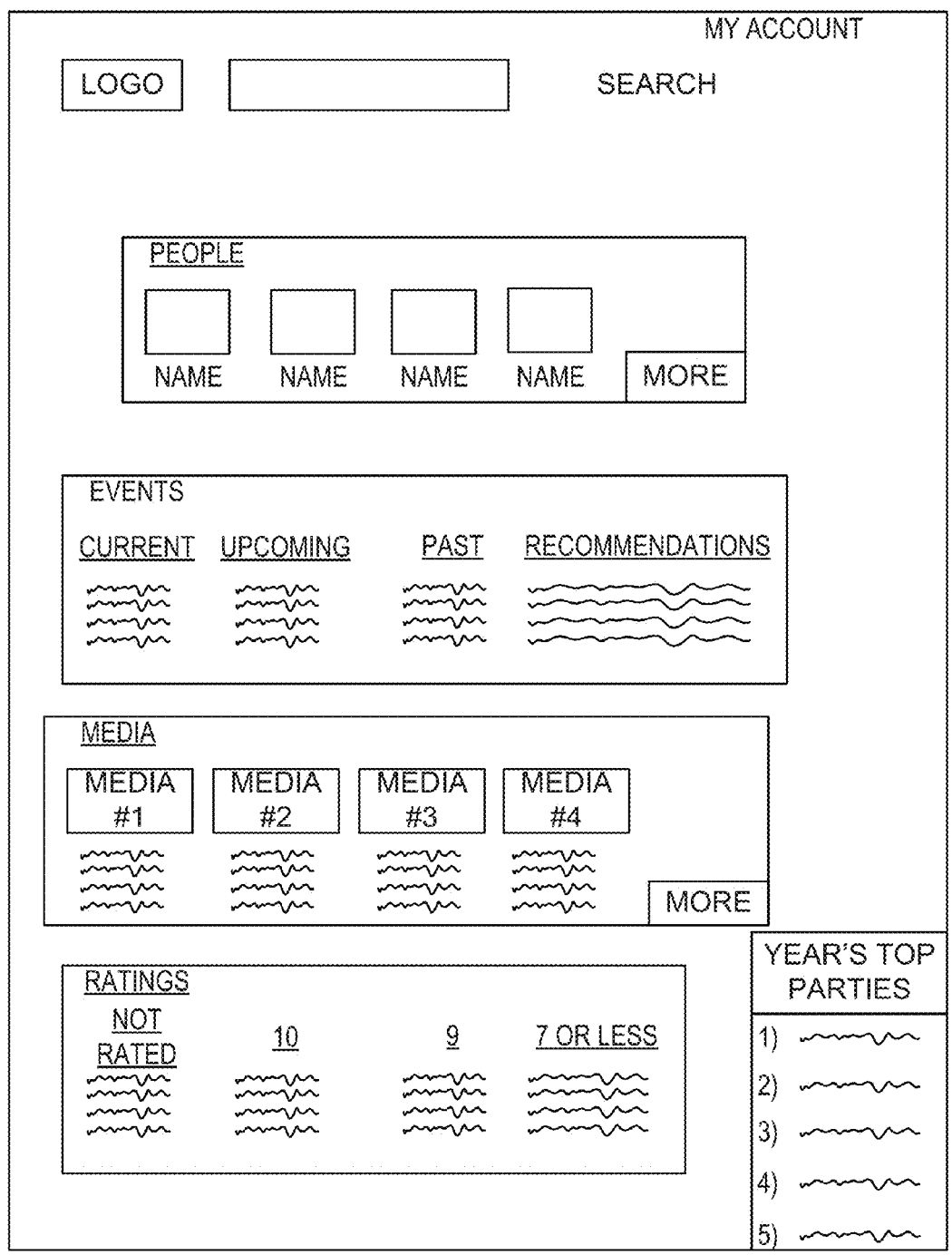
FIG. 25 illustrates an embodiment of a Website page according to an embodiment of the invention.

FIGS. 24 and 25 illustrate embodiments of Website pages 2400, 2500 according to an embodiment of the invention. The Website pages 2400, 2500 may be the home page for the HotSpot users. The search bar may enable the searching of people, names of events, dates, locations, etc. The People category may enable list of friends which may be synchronized with other social media networks, may enable the sending of messages to friends, may provide a feed of news regarding friends. The People category could have a list of best friends that shows users which events their best friends are going to. The Events may display past events attended and/or invited to, upcoming events and friends attending the upcoming events, enable viewing events during the event such as a real time stream of media being uploaded from the event. The Events may display under each listed event information such as when, where, time, who, media, and comments and description. The Media may enable viewing of videos and pictures. Each media item may be in order of date recorded. The description of the media may include the name of the event, date, and a number of media items.

The Ratings may enable the rating of events that may be after, during, or upcoming. The Ratings may list the events that you have not yet rated. The Ratings may enable a user to rate an upcoming party for whether or not they are going to attend it and enable their friends to see their rating of an upcoming party, so that a group of friends can decide whether or not to attend an event via feedback of their rating of the event. The Events may include the top events by rating, by attendance, by location, by matches to the interest of the user, etc. Update may enable synchronizing with other social media networks.

Figure 26:
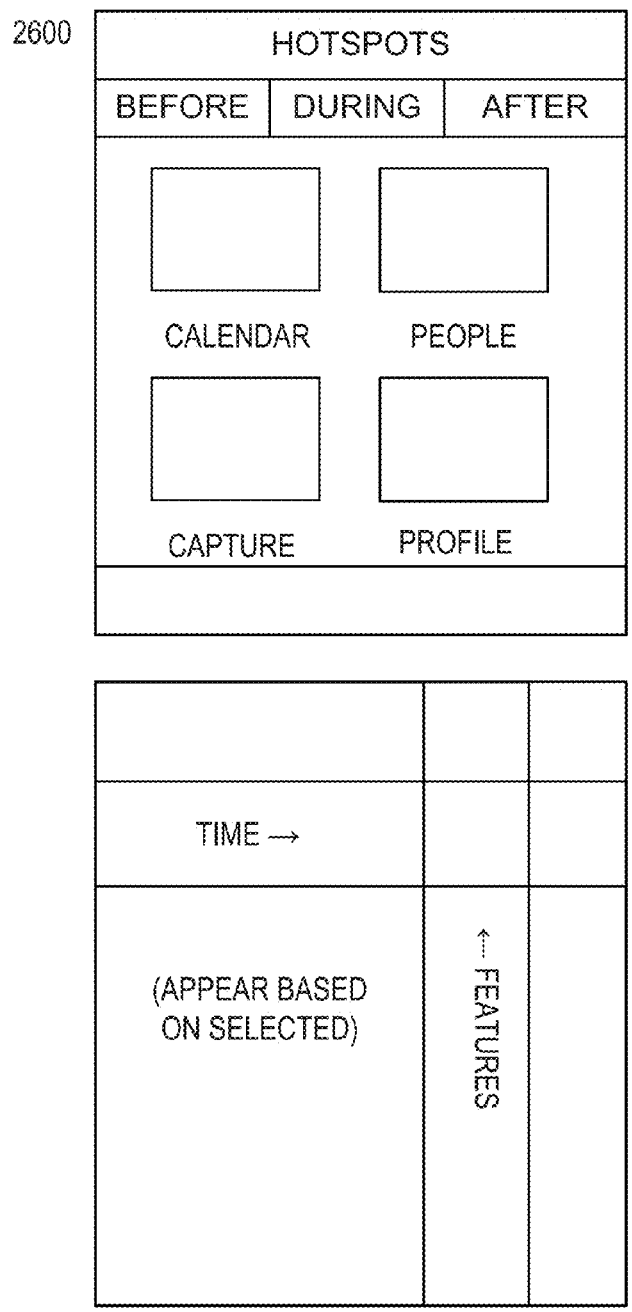
FIG. 26 illustrates an exemplary embodiment of a homepage layout that can be used to rapidly access other relevant pages.

FIG. 26 illustrates an exemplary embodiment of a homepage layout 2600 that can be used to rapidly access other relevant pages.

FIG. 27 illustrates possible icon designs 2700.

Figure 28:
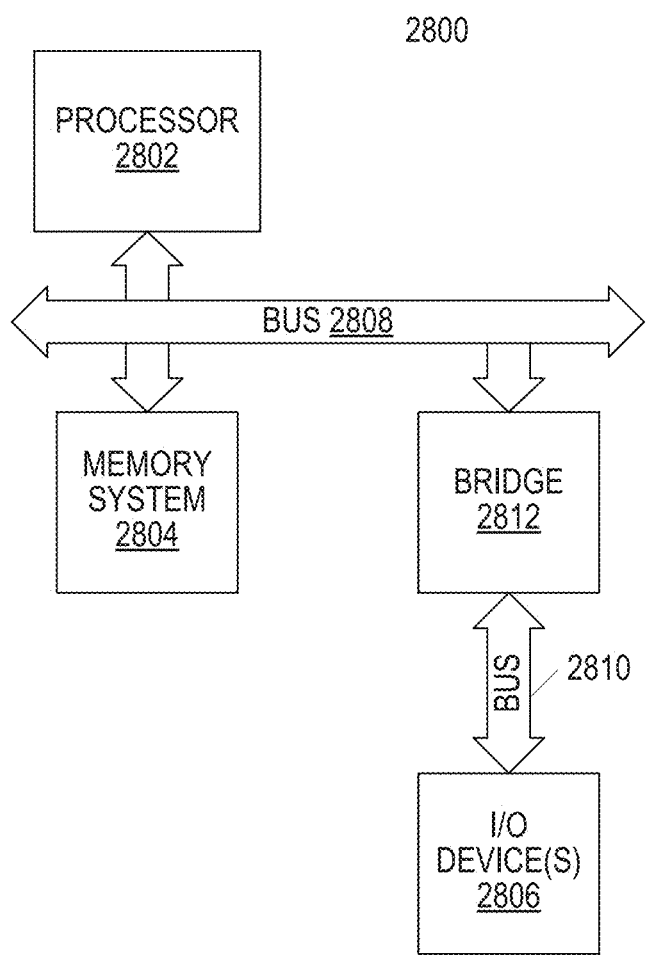
FIG. 28 is a simplified functional block diagram of a computer system server.

FIG. 28 is a simplified functional block diagram of a computer system server 2800. The HotSpot system can be implemented in hardware, software or some combination thereof. As shown in FIG. 28, the computer system 2800 includes a processor 2802, a memory system 2804 and one or more input/output (I/O) devices 2806 in communication by a communication 'fabric.' The communication fabric can be implemented in a variety of ways and may include one or more computer buses 2808, 2810 and/or bridge devices 2812 as shown in FIG. 28. The I/O devices 2806 can include network adapters and/or mass storage devices as well as I/O devices to interact with a user such as a display, keyboard, touch screen, etc. The computer system 2800 may retrieve user input over the I/O devices 2806 and may store event and user information in Memory System 2804 and/or over the I/O Devices 2806. The event and user information and the other information related to the system may reside on memory system 2804 and/or they may be retrieved over I/O devices 2806. For example, the events information may include a database of events stored across a network. Storage of the database may be either local such as a hard drive or memory as part of Memory System 2804 or storage may be over the communication fabric and retrieved over the I/O devices 2806. For example, computer system 2800 may be part of a handheld device and the events and users may be stored on a server on the Internet. The computer system 2800 may access the Internet via the I/O device 2806 which may include a cellular telephone transceiver. The communication fabric may be in communication with many networks including the Internet and local area networks, and may include wireless communication. The computer system 2800 may be part of a handheld device such as a telephone or a personal assistant or may be a more conventional computer.

Figure 29:
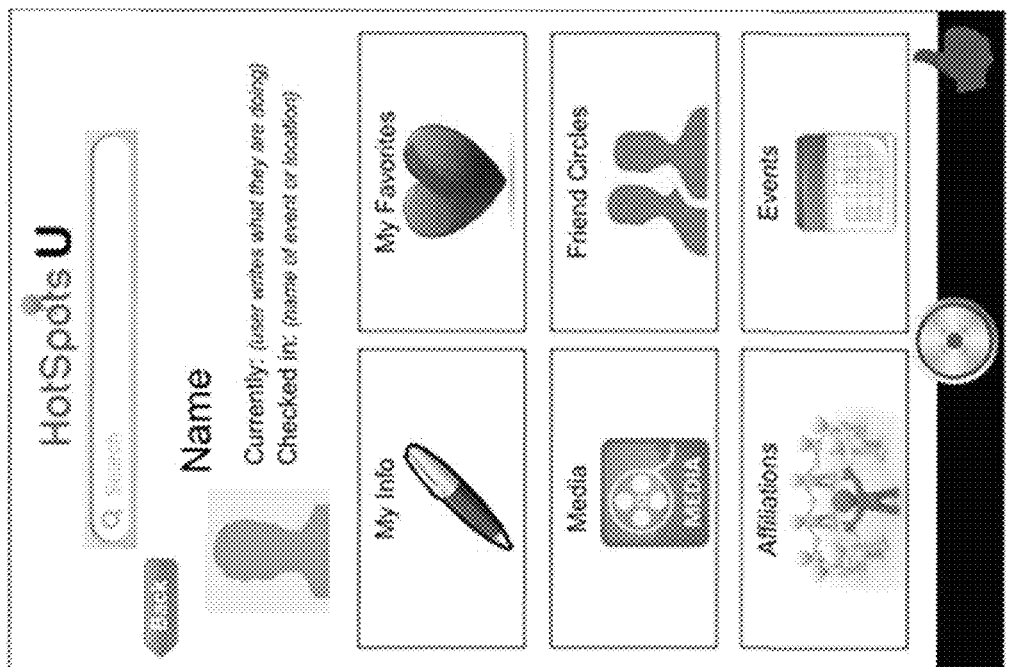

FIGS. 29-36 illustrate exemplary screenshots for implementing the system. FIG. 29 illustrates a way in which the user's profile page can be arranged. The profile is organized in such a way that the user can reach an array of information and resources all from their profile page. Through the profile page, the user can also change information about themself. The aesthetics of the page are designed through symbols in order to improve efficiency and speed at which users operate.

Figure 30:
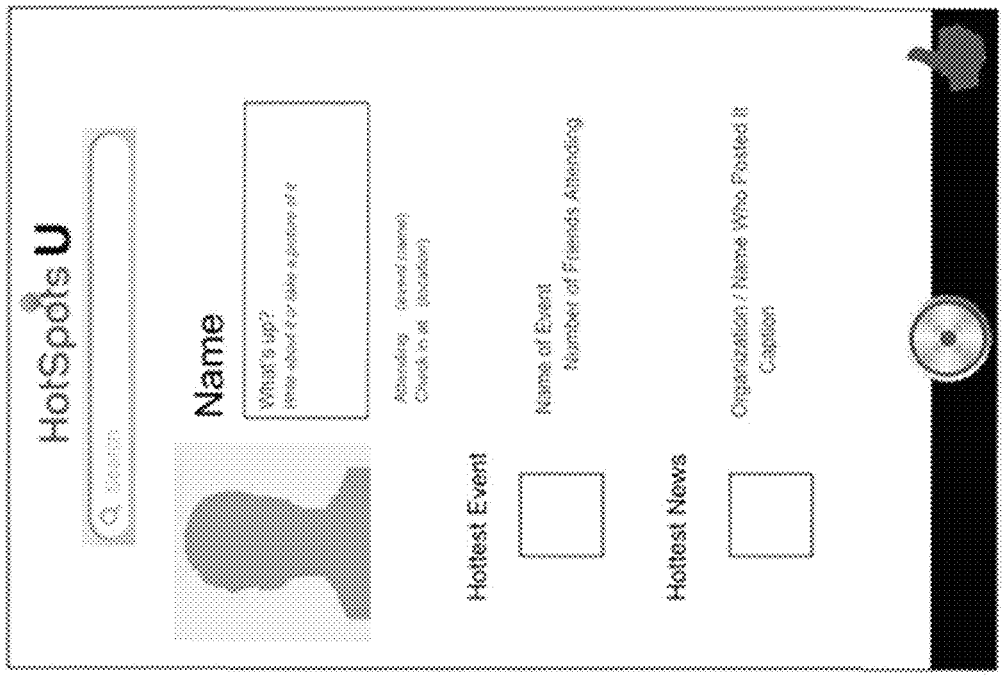
FIGS. 29-36 illustrate exemplary screenshots for implementing the system.

FIG. 30 represents the opening screen a user might see when they first open the HotSpotsU application. It has an overview of everything. The user can fill create a custom status in the box labeled "What's Up?" The user can also check-in at a specific event or location. Below that, the user can view information that is receiving a lot of attention within their social realm. The user would be able to see the event with the most views, the post (news) with the most views, or other highly viewed content.

Figure 31:
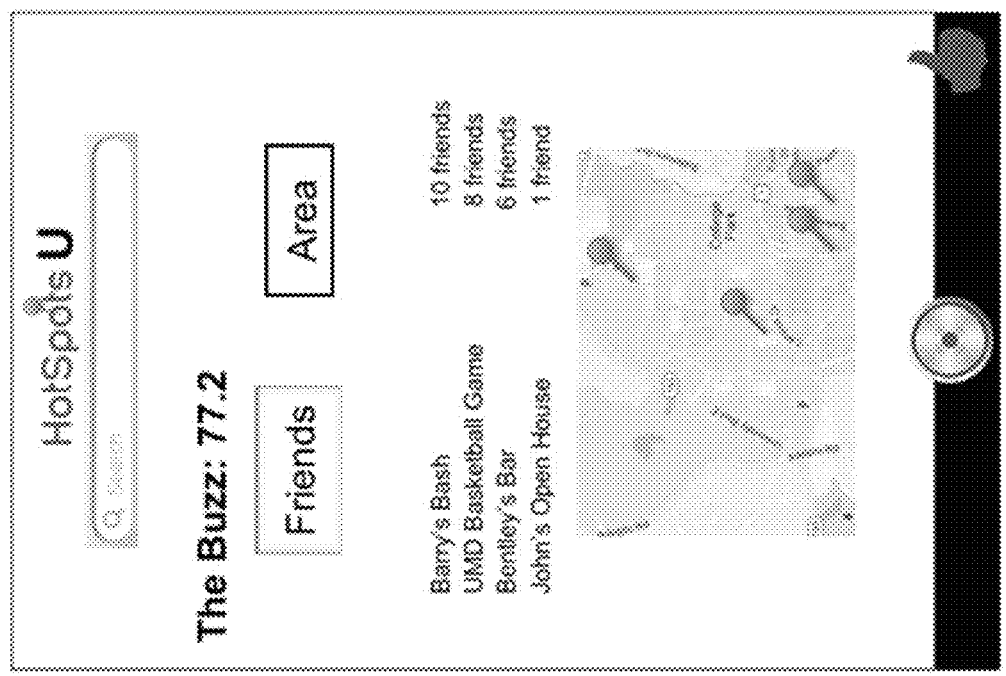

FIG. 31 illustrates a page within the HotSpotsU application called "The Buzz." This page is one-screen that compiles all the events that are going on at that time. The user can see the buzz amongst their friends (hangouts, events, etc.). The user can also see the buzz in their area (bars, sporting events, etc.).

Figure 32:
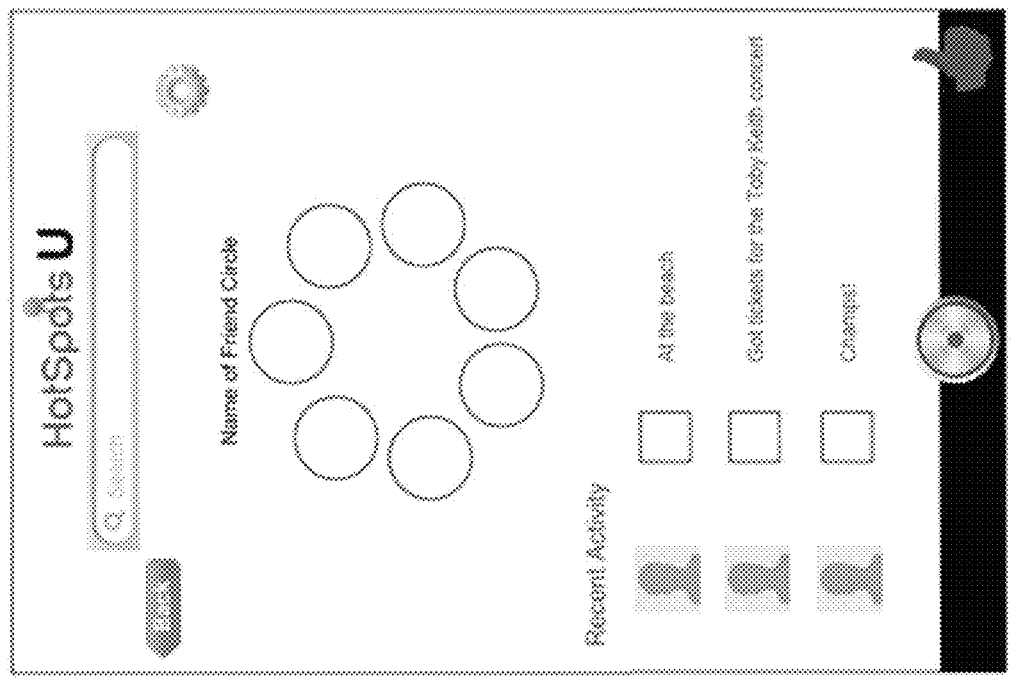

FIG. 32 depicts how a user is able to view their friends. A user organizes their friends into specific friend circles. When viewing a friend circle, the user sees all the content generated by those individuals. In the top right corner, the mechanic wheel is a settings button that allows the user to control the depth in which this group of people can view information about them.

Figure 34:
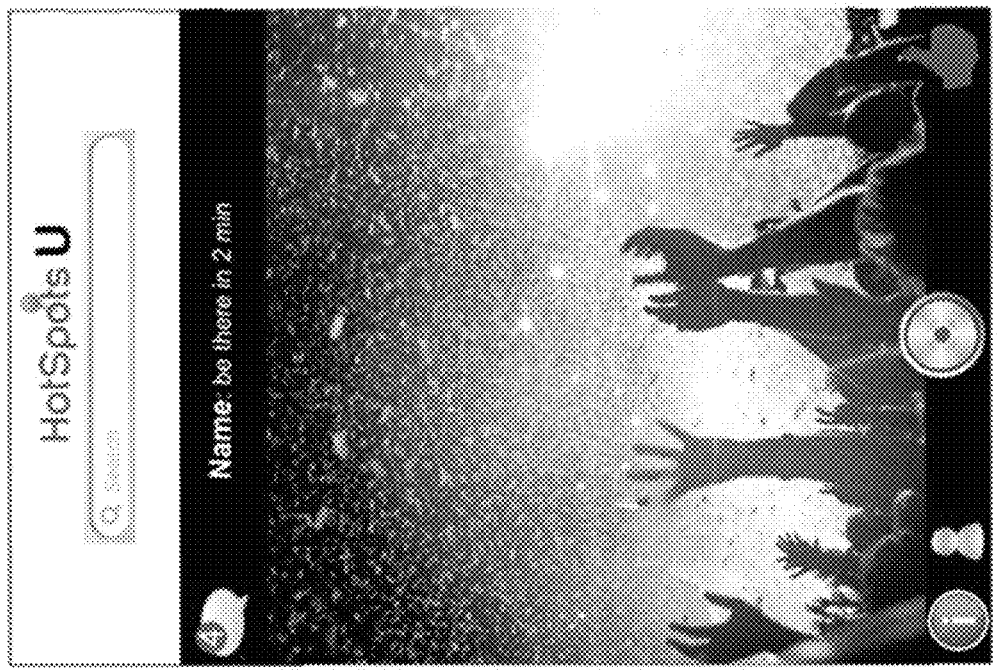

FIG. 34 illustrates the screen in which a user utilizes to invite friends to an event that the user is currently attending. The invitation can be sent to people who are registered users on HotSpotsU, as well as people who only have a smartphone. The "capture button" in the bottom-center of the screen allows the user to stream live video, end a live stream, and/or capture a single picture. When a user receives a text message, that user is alerted by the text message appearing on the top center portion of the screen.

Figure 33:
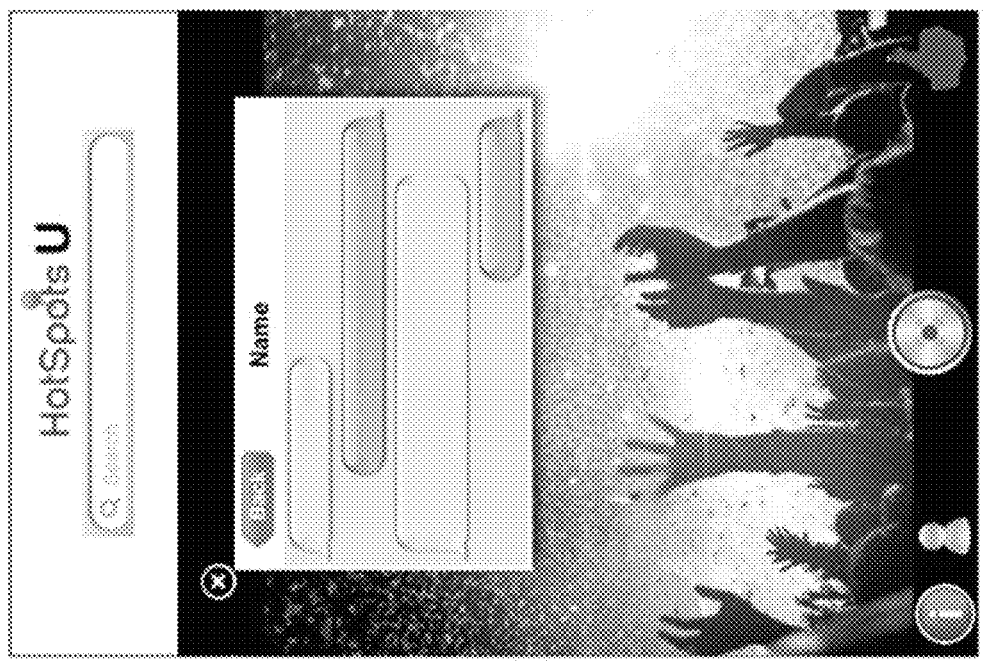
Figure 35:
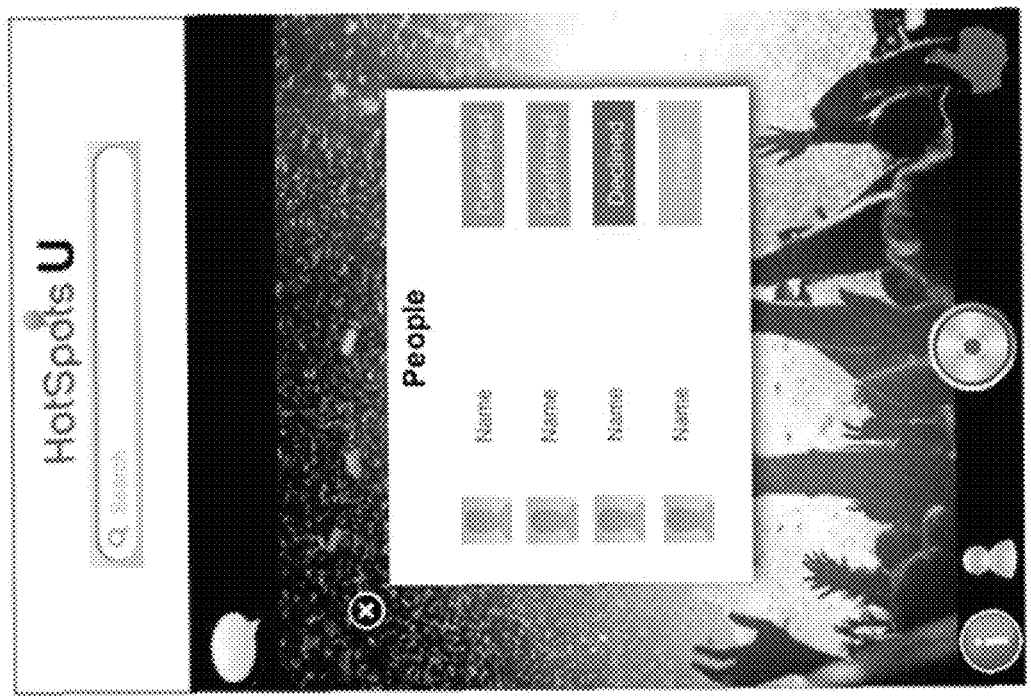

FIG. 33 illustrates how a user can engage in text message conversations while simultaneously streaming an invitation to another person. FIG. 35 shows how the user can choose whom to invite to the event they are currently at. The people who have "confirmed" next to them are currently at the event. The people with "declined" next to them chose not to attend the event. The people with "invite" next to them have not been invited to the event yet so this user can invite them.

Figure 36:
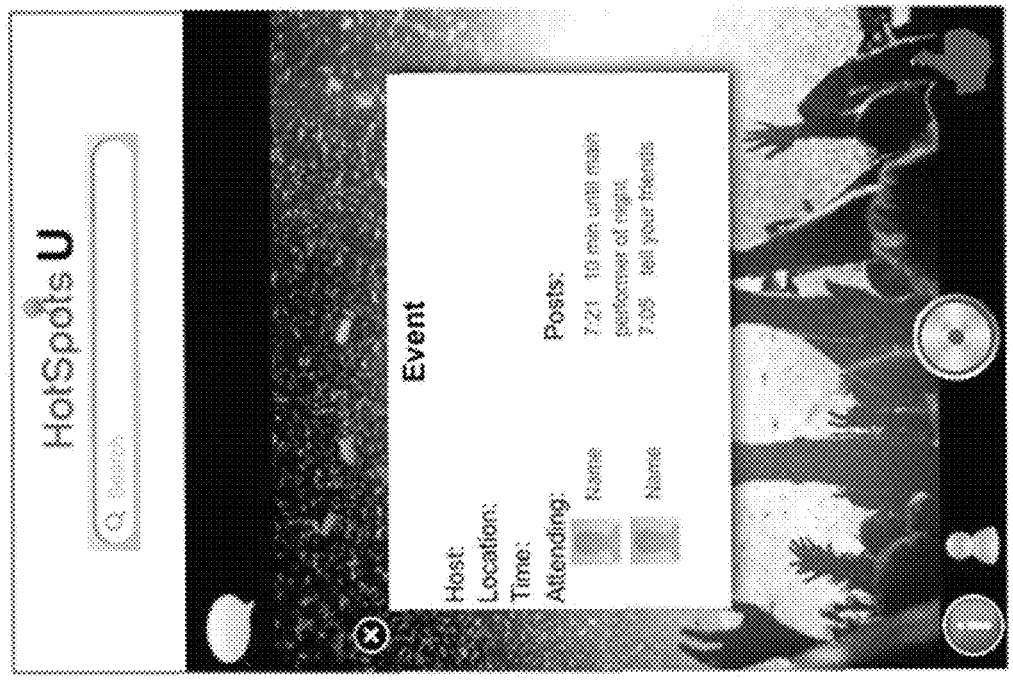

FIG. 36 shows how the user can access the event page to see information about the event they are currently at.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium, which may be in a physical form.

Although described in connection with preferred embodiments thereof, it will be appreciated by those skilled in the art that additions, deletions, modifications, and substitutions not specifically described may be made without departure from the spirit and scope of the invention as defined in the appended claims.

Disclosed is a method of managing an event. The method may include steps of: a) presenting events organized as before, during, and after; b) in response to the selection of a new event by a user, creating a new event; receiving from the user information regarding the event which may include media, needs for the event, location of the event; prompting the user for a list of users to invite to the event; c) sending invitation to the list of users; d) in response to the event beginning switching to during the event and displaying information regarding during the event; and e) in response to the event ending displaying the event status as ended, and allowing users that attended the event to rate the event and continue to upload media regarding the event.

A non-transitory computer program product is disclosed. The computer program product including a computer usable medium having a computer readable program code embodied therein, said computer readable program code adapted to be executed to implement a method of managing an event, said method including a) presenting events organized as before, during, and after; b) in response to the selection of a new event by a user, creating a new event; receiving from the user information regarding the event which may include media, needs for the event, location of the event; prompting the user for a list of users to invite to the event; c) sending invitation to the list of users; d) in response to the event beginning switching to during the event and displaying information regarding during the event; and e) in response to the event ending displaying the event status as ended, and allowing users that attended the event to rate the event and continue to upload media regarding the event.

A computer system for managing an event, the system including a process adapted to a) present events organized as before, during, and after; b) in response to the selection of a new event by a user, create a new event; receiving from the user information regarding the event which may include media, needs for the event, location of the event; prompting the user for a list of users to invite to the event; c) send invitation to the list of users; d) in response to the event beginning switch to during the event and display information regarding during the event; and e) in response to the event ending display the event status as ended, and allowing users that attended the event to rate the event and continue to upload media regarding the event.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The embodiments herein may be described in terms of functional block components and various processing steps. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Expressions such as "at least one of," when preceding a list of elements, modify the entire list of elements and do not modify the individual elements of the list.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A method for operating a mobile device operated by a user at an event, comprising:
    capturing real-time audio, image, or video information of the event at a location of the event during the event on the mobile device;
    selecting a specific invitee from the user's list of confirmed friends during the event;
    transmitting an invitation to attend the event to the specific invitee during the event comprising necessary details for attending the event contemporaneous with and integrated with the captured real-time information;
    performing a crowd breakdown by analyzing one or more predefined factors of people attending the event, wherein the analyzing is based on analyzed said real-time image or video information;
    communicating the crowd breakdown in terms of the predefined factors with the real-time information in the invitation;
    obtaining location information using the mobile device;
    communicating the location information with the real-time information;
    providing transportation information including instructions for using available transportation elements to get to the event along with the invitation;
    wherein the real-time information further comprises a text message that tags the real-time information; and
    providing a rating for the current event.

2. The method according to claim 1, wherein the real-time information is at least one of live streamed video and live streamed audio.

3. The method according to claim 1, further comprising:
    wherein the performing a crowd breakdown by analyzing one or more predefined factors of confirmed people attending the event is based on information registered by the people attending the event.

4. The method according to claim 1, wherein the predefined factors are selected from the group consisting of age, gender, and relationship status.

5. The method according to claim 1, wherein the obtaining of the location information is obtaining GPS information by a GPS component of the device.

6. The method according to claim 1, further comprising:
    recommending a list of present or future events ratings based on one or more past events or interests as self-described by a user on an Interest section in their profile.

7. The method according to claim 1, further comprising:
    recommending people, based on at least one of: a) a list of individuals based on mutual social connections, b) individuals who have similar self-described interests, and c) individuals who have attended one or more of the same events as a user for whom these "people" recommendations are being generated for.

8. The method according to claim 7, wherein the recommending is based on at least two of (a)-(c) in order to provide accurate recommendations that would be most appealing for a particular user.

9. The method according to claim 1, wherein the specific invitee is selected from a list of predefined accepted friends.

10. The method according to claim 9, further comprising:
    accessing information about events attended by a plurality of the predefined friends contingent upon privacy settings set by the predefined friends.

11. The method according to claim 1, further comprising:
    posting the captured real-time information to a server accessible by a plurality of users;
    wherein the transmitting of the invitation comprises including a link to the posted information.

12. The method according to claim 1, further comprising: arranging transportation for the specific invitee.

13. A method for managing social interactions of a user at an event, comprising:
    capturing real-time audio, image, or video information of the event at a location of the event during the event on a mobile device;
    selecting an invitee on the device during the event;
    transmitting an invitation to attend the event to the selected invitee during the event comprising necessary details for attending the event contemporaneous with and integrated with the captured real-time information;
    performing a crowd breakdown by analyzing one or more predefined factors of people attending the event, wherein the analyzing is based on analyzed said real-time image or video information;
    communicating the crowd breakdown in terms of the predefined factors with the real-time information in the invitation;
    obtaining location information using the device;
    communicating the location information with the real-time information;
    providing transportation information including instructions for using available transportation elements to get to the event along with the invitation;
    wherein the real-time information further comprises a text message that tags the real-time information; and
    providing a rating for the current event.

14. The method according to claim 13, further comprising: arranging transportation for an invitee to whom the invitation was transmitted.

15. A system for managing an invitation for a current event, comprising:
a mobile device comprising:
a hardware processor;
an information capturing element comprising a microphone or camera that captures real-time audio, image, or video information of the event at a location of the event during the event;
a selecting element comprising at least one of a display and a software algorithm that allows selecting an invitee to the event during the event; and
a transmitter comprising wireless communication circuitry and software algorithms for transmitting an invitation to attend the event to the invitee during the event comprising necessary details for attending the event contemporaneous with and integrated with the captured real-time information;
wherein the mobile device:
performs a crowd breakdown by analyzing one or more predefined factors of people attending the event, wherein the analyzing is based on analyzed said real-time image or video information;
communicates the crowd breakdown in terms of the predefined factors with the real-time information in the invitation;
obtains location information using the device;
communicates the location information with the real-time information;
provides transportation information including instructions for using available transportation elements to get to the event along with the invitation;
wherein the real-time information further comprises a text message that tags the real-time information; and
provides a rating for the current event.

16. The system according to claim 15, wherein the mobile device further: arranges transportation for an invitee to whom the invitation was transmitted.

* * * * *